United States Patent [19]

Hauptschein et al.

[11] Patent Number: 5,117,422

[45] Date of Patent: May 26, 1992

[54] METHOD FOR PROVIDING AN EFFICIENT AND ADAPTIVE MANAGEMENT OF MESSAGE ROUTING IN A MULTI-PLATFORM AND APPARATUS COMMUNICATION SYSTEM

[75] Inventors: Arthur Hauptschein, Tenafly; John B. Kennedy, Nutley, both of N.J.; Arthur Doskow, New York, N.Y.

[73] Assignee: ITT Corporation, New York, N.Y.

[21] Appl. No.: 551,177

[22] Filed: Jul. 9, 1990

[51] Int. Cl.⁵ .............................................. H04J 3/16
[52] U.S. Cl. ..................................... 370/95.1; 370/77; 370/93; 340/825
[58] Field of Search .................. 370/94.1, 60, 62, 95.3, 370/93, 77, 95.1; 340/825

[56] References Cited

U.S. PATENT DOCUMENTS

| | | | |
|---|---|---|---|
| 4,507,781 | 3/1985 | Aharey | 370/95.3 |
| 4,713,806 | 12/1987 | Oberlander | 370/62 |
| 4,792,948 | 12/1988 | Hampen | 370/68 |
| 4,849,968 | 7/1989 | Turner | 370/94.1 |
| 4,864,559 | 9/1989 | Perlman | 370/60 |
| 4,912,656 | 3/1990 | Cain et al. | 340/827 |

*Primary Examiner*—Douglas W. Olms
*Assistant Examiner*—T. Samuel
*Attorney, Agent, or Firm*—Arthur L. Plevy

[57] ABSTRACT

The method for providing an efficient and adaptive management of message routing in a multi-platform, communication system having dynamically changing platform populations and dynamically changing connectivities between platforms where each of the platforms are capable of performing the steps of recognizing at least certain ones of the platforms in the system, deriving from at least one of the recognized platforms the quality of interconnectivities of the recognized platforms and certain others of the platforms in the system; and employing the derived quality of interconnectivities to make connectivity-based routing decisions using a selective one of a point-to-point routing algorithm, a point-to-multipoint routing algorithm and a broadcast routing algorithm.

22 Claims, 17 Drawing Sheets

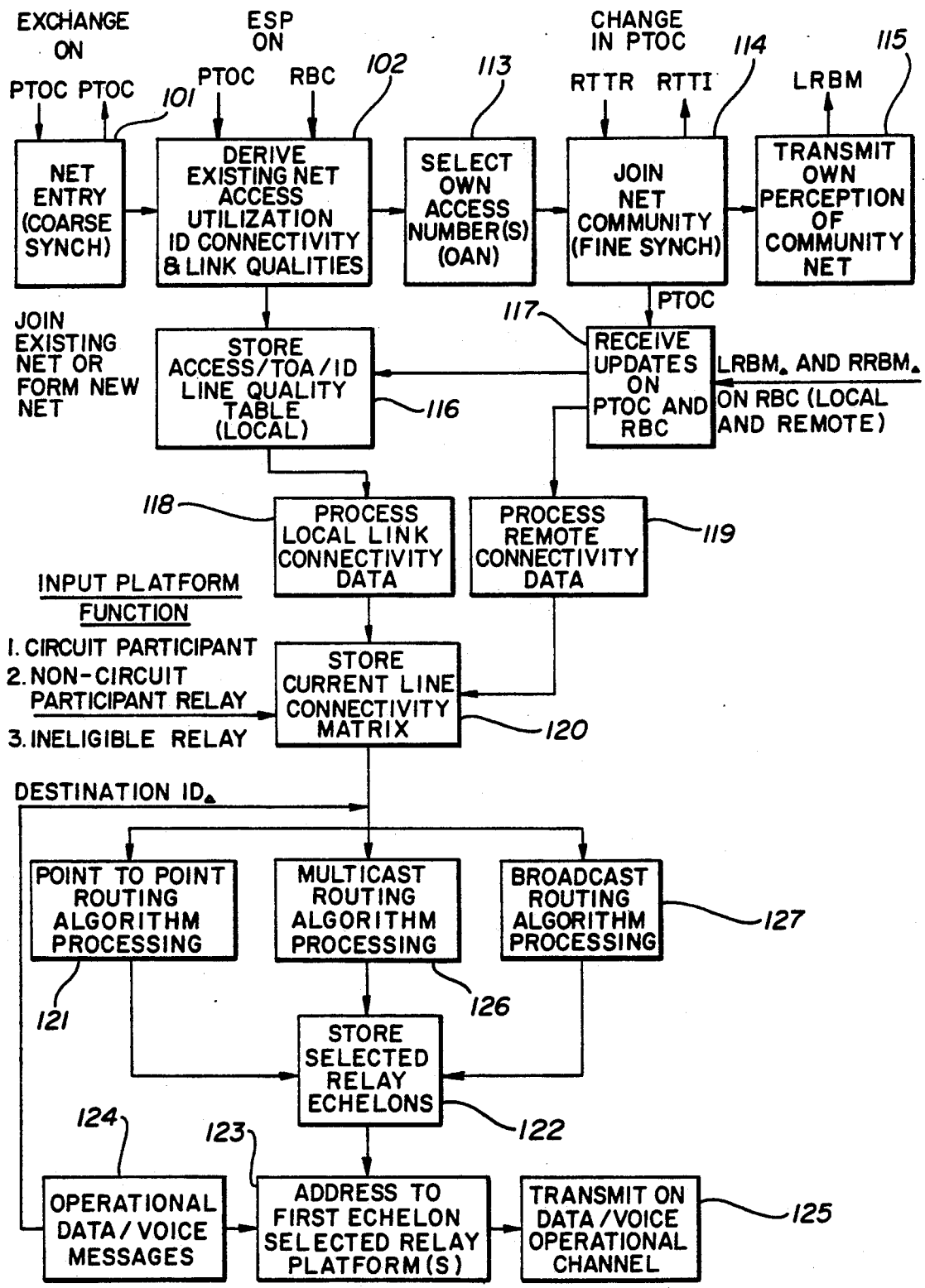

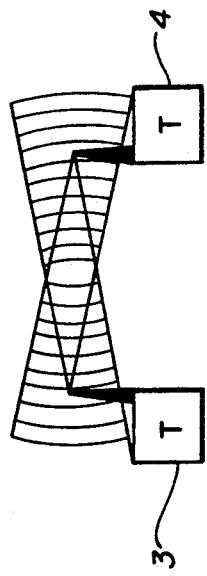
FIG-5A
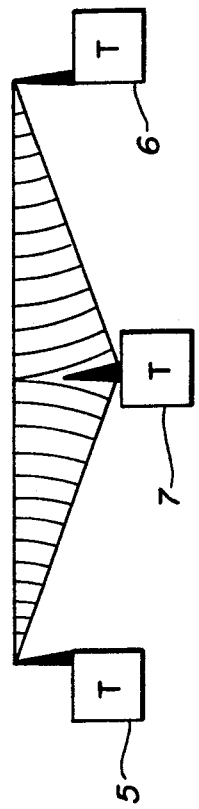
FIG-5B
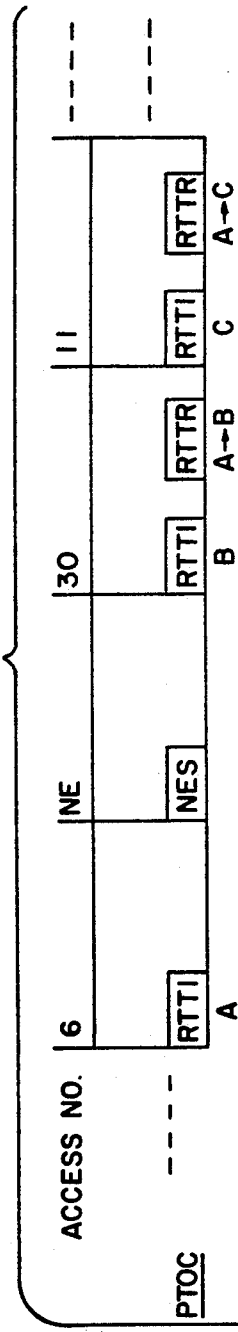
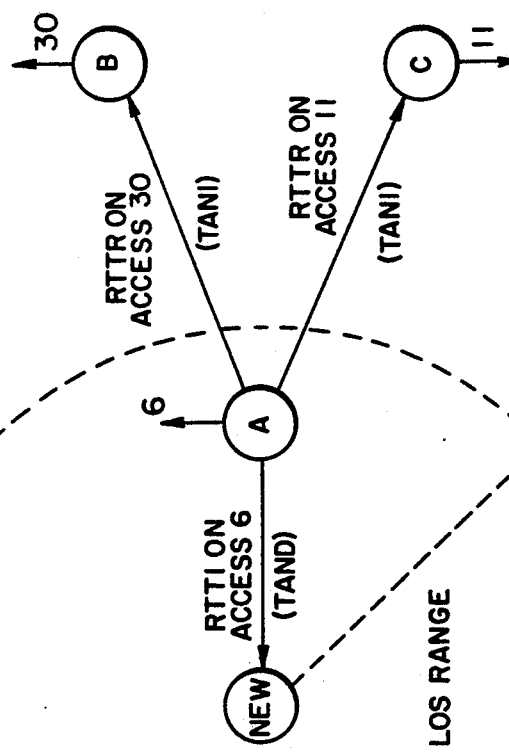
FIG-6

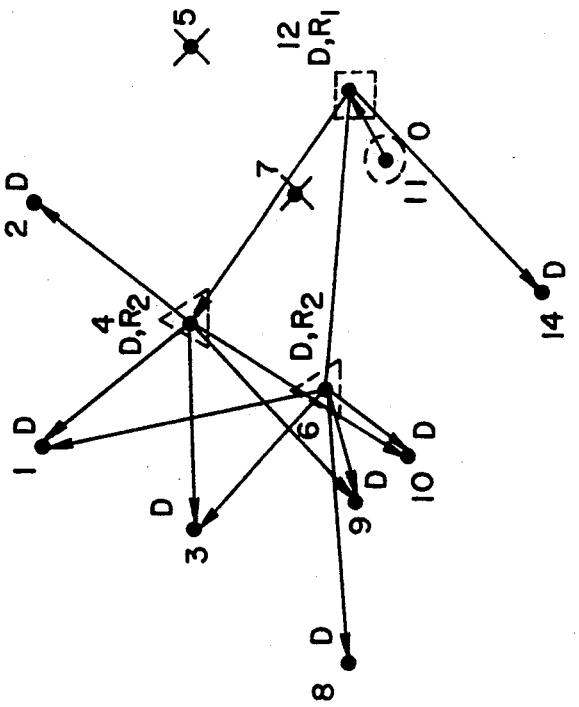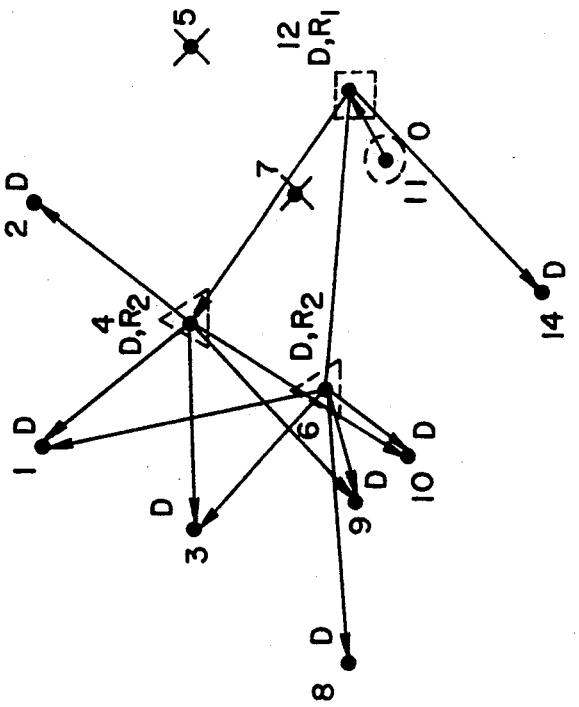
FIG-23B
FIG-23A

METHOD FOR PROVIDING AN EFFICIENT AND ADAPTIVE MANAGEMENT OF MESSAGE ROUTING IN A MULTI-PLATFORM AND APPARATUS COMMUNICATION SYSTEM

BACKGROUND OF THE INVENTION

The present invention relates to multi-platform communication systems and more particularly to a method and apparatus for providing an efficient and adaptive management of message routing in such communication systems.

Prior art net management solutions for management of message routing use techniques which require, one or more controller nodes or platforms, fixed a priori relay and routing assignments, and redundant transmissions.

The vulnerability of controller nodes to attrition, equipment failures, and electromagnetic countermeasures (jamming) make centrally controlled networks undesirable. Moreover, complex controller nodes must restrict their motion with respect to the remainder of the network community. Centrally controlled networks are critically dependent on links between the controller and its subsidiary platforms.

Fixed relay and routing assignments, either on the basis of time or frequency, prevent adapting to dynamic network connectivity changes and results in less reliable message delivery. Networks can vary because of: (1) changing populations due to new platform entries and exits or physical attrition and (2) changing connectivity due to platform motion, enemy jamming or transmission media disruptions. Rigid routing on the basis of frequency or time may also lead to a limited number of high density traffic patterns. Concentrated relay transmissions can lead to easier platform detection by intercept receivers and subsequent jamming will lead to large disruptions of network communications. Also, the overloading of a platform's terminal resources with non-adaptive redundant routing leads to underutilization of network capacity and, hence, increased message delay.

Excessive redundant transmissions should also be avoided because they not only consume precious channel capacity, but will result in increases in self-interference levels which will, in turn, reduce anti-jamming protection.

The foregoing has focused primarily on point-to-point communications in networks of low to medium connectivity which are typical characteristics, for example, of Army ground deployments. Other applications, for instance, Navy and Air Force communications, require, in addition, point-to-multipoint (multicast) routing, and in the limit broadcast routing. In these cases, a terminals transmissions are intended for a set of terminals or platforms performing the same or related warfare functions. In point-to-point routing, the broadcast nature of radio transmissions may create interference problems not encountered in wire networks. In point-to-multipoint routing, however, this broadcast capability can be used to advantage since multiple relays and/or destinations may be reached with a single transmission.

Repromulgation relay (flood routing) is a frequently used technique to perform a multicast routing. In this method, all terminals receiving a transmission for the first time retransmit it. Therefore, these transmissions propagate outwards from their originator until they reach all other terminals in the community, including all intended destination(s). This scheme is inefficient in terms of the number of transmissions it requires, significantly reducing system capacity. The inefficiency is greatest for networks with a high degree of connectivity.

Furthermore, in general, automated relay selection methodologies can be divided into two types: (1) geometric-based and (2) connectivity-based. The present invention focuses on the latter approach which uses exchanged connectivity information (identifying both one-way and two-way links) to make informed relay platform selections. The problem addressed in this scheme is, how can a (partial) knowledge of network connectivity allow a terminal to select relays for a message so that it can reach its intended destination(s)? In contrast, the problem addressed in geometric-based schemes is, without knowing terminal connectivity, what is the best way to assure reaching one or more intended destigations?

Geometric-based relay presumes relay suitability from position information (e.g. attitude and received position messages) and is most applicable to air platforms. Since there is no information on routes to destinations, coverage of the entire community is attempted. Message delivery is thus probabilistic. The cost of increasing this probability is increased message redundancy. However, the obtainable redundancy and reliability decrease as operational load traffic increases. The use of redundancy for relay reliability is an expensive use of system capacity. Redundancy also leads to increased circuit activation by non-circuit participant relays and hence, increased use of their terminal resources. This occurs because non-connectivity based relay assigns relay responsibility on a circuit rather than on an originator basis. Thus, it is possible that a set of relays which works for one originator will not work for another originator. There is no self-correction mechanism to modify the selection of relays. Also, relays are not aware of whether or not all originators are being relayed or if all destinations are being reached. FIG. 1 illustrates how a destination may not be reached if relays only share circuit responsibility and do not consider connectivity. As illustrated platform A and platform B share relay load for several circuits, but if platform A is assigned circuits on which platforms O and C are participants, platform C will not receive the originator's messages.

Other pitfalls of non-connectivity based relay schemes also are shown in FIGS. 2 and 3. Without considering link connectivity in each direction, it is possible that geometric types of criteria for selecting relays will not provide adequate performance in hostile environments. In FIGS. 2 and 3, platform A appears to be the best relay from its own perspective of comparative altitude and the number of incoming links. However, the presence of jamming on back links, or on links from source platforms to the intended relay, may negate the relay function. In FIG. 2 platform A, which has the highest altitude, receives messages from platforms B, C and D and appears to be in the best geometric position to relay between messages C and D. However, even though platforms A and B receive the same number of position messages, namely, three, the presence of jammers J and range attenuation break any connectivity from A to C or from A to D and leave relay B the only suitable relay between C and D. In FIG. 3, platform A appears to be a better relay than B or C by geometry, but because of jammer J, it cannot hear the originator's messages which it is supposed to relay. It should also be noted that geometric information cannot take antenna pattern directivity into consideration. Geometry does not necessarily imply connectivity.

A connectivity-based relay approach offers a significant enhancement over geometric-based schemes since both geometric factors, (e.g. range, altitude, obstructions, etc.), as well as terminal and jammer parameters, (e.g. transmit and receive power and antenna gains), are automatically considered in the assessment of link qualities in each direction.

Prior art approaches to network management solutions assume an established and static network based on frequency and/or time and determine how best to automatically route traffic between nodes (platforms).

SUMMARY OF THE INVENTION

An object of the present invention is to provide an improved solution for network management and the routing of messages in a multi-platform communication system.

Another object of the present invention is the efficient and adaptive provision of these network management and routing functions in a multi-platform communication system having changing platform populations and changing platform link connectivity.

Still another object of the present invention is to provide these functions by means of distributed masterless self-organization (DMSO) so that terminals can act autonomously on received information and function efficiently in the absence of any external control.

Although useful for military appplications, DMSO has applicability to other environments where mobile limited range radios are used, e.g., emergency task force communications, mobile telephones, and paging systems.

Using DMSO concepts, the prerequisite problem of recognizing the existence of nodes (platforms) and the extent and quality of their interconnectivities is first solved. Then, based upon this derived information, connectivity-based routing decisions, (in contrast to geometric-based decisions), are made using a point-to-point routing algorithm, a point-to-multipoint routing algorithm, or a broadcast routing algorithm as necessary. Furthermore, in DMSO, each terminal monitors, communicates and updates the current state of network connectivity since a dynamic network is presumed. This is an especially important point to consider in hostile environments. In general, DMSO addresses the characteristics of network robustness, survivability and adaptability. In order to satisfy communication message deliverability requirements for both data and voice traffic in a timely fashion, each platform is provided the ability to establish and maintain knowledge of the network connectivity and use it effectively.

A feature of the present invention is the provision of a method for providing an efficient and adaptive management of message routing in a multi-platform communication system having dynamically changing platform populations and dynamically changing connectivities between platforms where each of the platforms is capable of performing the steps of recognizing at least certain other platforms in the system; deriving from at least one of the recognized platforms the quality of interconnectivities of the recognized platforms and certain others of the platforms in the system; and employing the derived quality of interconnectivities to make connectivity based routing decisions using either a point-to-point routing algorithm, a point-to-multipoint routing algorithm, or a broadcast routing algorithm as required. A further feature of the present invention is the provision of the procedures for deriving and continuously monitoring the current state of the quality of interconnectivities procedures for updating the routing decisions when the quality of interconnectivities changes.

Another feature of the present invention is the provision of the procedures for employing the above-mentioned knowledge effectively to satisfy communication message deliverability requirements for both data and voice in a timely fashion.

Another feature of the present invention is the provision of a system for efficient and adaptive management of message routing in a multi-platform communication system having dynamically changing platform populations and dynamically changing connectivities among the multiple platforms, where each of the platforms includes first, the means to recognize at least some of the other platforms, second, the means (coupled to the first means) to derive from at least one of the recognized platforms the quality of interconnectivities of the recognized platforms and certain others of the platforms; and third, the means (coupled to the second means) to make connectivity-based routing decisions using the derived quality of interconnectivites and a selected one of a point-to-point routing algorithm, a point-to-multipoint routing algorithm and a broadcast routing algorithm.

Another feature of the present invention is the provision of a system for efficient and adaptive management of message routing in a multi-platform communication system having dynamically changing platform populations and dynamically changing connectivities among the platforms where a new platform entering the communication system comprises first, means to derive from at least one of the existing platforms access slots used by active platforms, connectivity between active platforms, and the quality of those connectivities; second, means coupled to the first means, to select an access slot for its communications, to join active platforms in the communications system using the selected access slot, and to receive updates on changing platform populations and changing quality of connectivities in the communication system; third, means, coupled to the first and second means, to process local connectivity data from those active platforms within line-of-sight range and to process remote connectivity data originated by platforms beyond the given line-of-sight range; and fourth, means, coupled to the third means, to utilize the processed local and remote connectivity data to make connectivity-based routing decisions using a point-to-point routing algorithm, a point-to-multipoint routing algorithm or a broadcast routing algorithm as appropriate.

Another feature of the present invention is the provision for employing an original algorithm, referred to as the truncated Dijkstra algorithm, for the point-to-point routing algorithm.

Another feature of the present invention is the provision for employing an original point-to-multipoint routing algorithm which utilizes Floyd's path length algorithm.

BRIEF DESCRIPTION OF THE DRAWINGS

Above-mentioned and other features and objects of this invention will become more apparent by reference to the following description taken in conjunction with the accompanying drawings, in which:

FIG. 4 is a block diagram illustrating the operation of the DMSO in accordance with the principles of the present invention;

FIGS. 5A and 5B illustrate two types of access conflict avoided and resolved in accordance with the principles of the present invention;

FIG. 6 is a diagram illustrating the access acquisition by an entering platform using time division multiple access architecture in accordance with the principles of the present invention;

FIG. 12 is a diagram illustrating a connectivity matrix which is updated from a local route broadcast message in accordance with the principles of the present invention;

FIG. 23A and 23B are diagrams illustrating the operation employing the original DMSO point-to-multipoint routing algorithm with platform losses in the arrangement of FIG. 22A.

DESCRIPTION OF THE PREFERRED EMBODIMENTS

Acronyms Employed Herein

Figure 1:
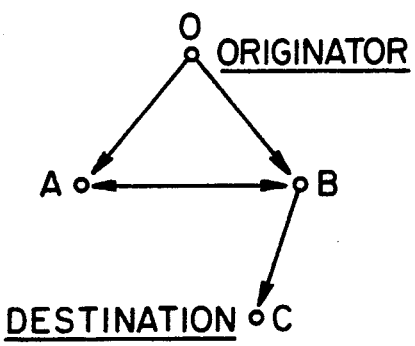
FIGS. 1, 2 and 3 are diagrams illustrating the disadvantage of non-connectivity based relay arrangements of the prior art described hereinabove under the heading "BACKGROUND OF THE INVENTION"
Figure 2:
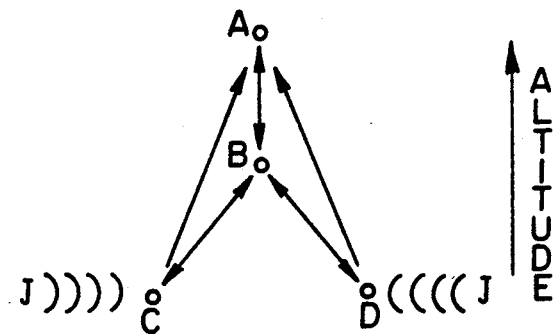
Figure 3:
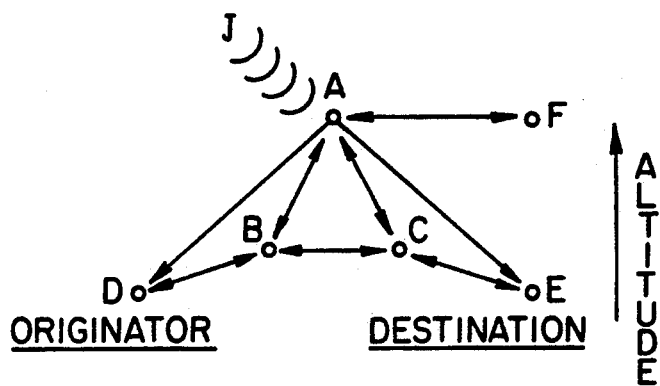

| | |
|---|---|
| AAN | Available Access Numbers |
| AJ | Anti-Jamming |
| COMSEC | Communication Security |
| DMSO | Distributed Masterless Self-Organization |
| DTDMA | Distributed Time Division Multiple Access |
| EMCON | Emission Control |
| ID | Identity |
| LOS | Line-of-Sight |
| LPI | Low Probability of Intercept |
| LRBC | Local Route Broadcast Circuit |
| LRBC-O | LRBC - Originate |
| LRBC-R | LRBC - Relay |
| LRBM | Local Route Broadcast Message |
| NE | Net Entry |
| NES | Net Entry Signal |
| OAN | Own Access Number |
| PTOC | Position, Time and Organization Circuit |
| PTOCC | Position, Time and Organization Common Circuit |
| PTOUC-N | Position, Time and Organization User Circuit, where N would be selected to be commensurate with the size of the local community of interest |
| RBC | Route Broadcast Circuit |
| RRBC | Remote Route Broadcast Circuit |
| RRBM | Remote Route Broadcast Message |
| RTT | Round Trip Timing |
| RTTI | RTT Interrogations |
| RTTR | RTT Replies |
| SOC | Self-Organizing Circuit |
| TAND | Taken Access Number of a Direct Neighbor |
| TANI | Taken Access Number of an Indirect Neighbor |
| TDMA | Time Division Multiple Access |
| TOA | Time of Arrival |
| TRANSEC | Transmission Security |

The present invention is concerned with a DMSO scheme which is a generic scheme overcoming the aforementioned problems of the prior art.

The DMSO is referred to as distributed because the processing of network connectivity and status information is fully distributed across all network members or platforms and each member acts autonomously, using the same algorithms to route message traffic to the destination(s). The DMSO is referred to as masterless because the scheme has no requirement for any controller nodes and any of their attendant complexity and restrictions. The DMSO is referred to as self-organizing since no a priori information on the identity of community members and their connectivity is required. This information is acquired by members or platforms participating in the DMSO process described herewith below.

The DMSO methodology facilitates the establishment and maintenance of communication among an arbitrarily configured and dynamic community of platforms, which in general may have multimedia transmission capabilities. The DMSO methodology minimizes the a priori constraints which are imposed upon platform deployment decisions. Operating under DMSO, platforms are constantly sensing their internal status and incoming connectivity, reporting that information to their (outgoing) neighbor platforms, and acting autonomously based on this information to efficiently route and load share operational message traffic. Its distributed processing provides robustness in degraded networks. By enabling platforms to adapt to network changes, it makes the terminal community self-healing and prevents disruptions from persisting. A DMSO system is not vulnerable to the loss of a controller node, or any other node so long as some connectivity exists among active platforms and node or platform motions are not restricted.

The functional requirements of DMSO are supported by appropriate utility circuit designs, memory, and processing resources. Utility circuits are low overhead circuits when contrasted with "operational" circuits carrying data/voice traffic. These requirements encompass the following issues:

a. The design of a utility SOC which supports the communication needed to establish and maintain DMSO. The phases of DMSO encompass the ability for a platform to enter an existing net, or form a new net, through full participation as an entered platform.

b. The specification of a protocol which mediates the use of a shared SOC in order to provide non-contending accesses for platforms within range of each other.

c. The provision for platforms to determine and exchange identities, loadings, connectivity and link reliabilities of local and remote platforms, in a timely fashion.

d. The specification of algorithms to find the current, best routing of messages based upon the information acquired on the SOC.

e. The specification of a methodology for delivering message traffic. For example, the originator could specify all of the relays along a path, or each echelon of relay could specify the next echelon of relay.

The DMSO process is accomplished by platform participation in a SOC. The scheme permits platforms, with a minimal set of initialization parameters, to enter and join a communication network without a prior access organization or coordination. The SOC comprises two parts: (1) PTOC and (2) RBC.

FIG. 4 is a functional block diagram of the major components or steps of the DMSO arrangement.

The PTOC is used by platforms to achieve net entry (net time synchronization) and to establish non-interfering, transmission-access opportunities. This is shown in block 101 of FIG. 4. Since range is derived from time, and must be updated periodically to accommodate platform motion and clock drifts, common signals for net entry and local net organization functions are used. The RBC is used to propagate information such as, platform identities, connectivity, link reliabilities, transmit and receive loadings, etc., as shown in blocks 102 and 117 of FIG. 4. In general, the RBC consists of two components: an LRBC and an RRBC. The LRBC normally supports organization data exchange among platforms within a few relay hops of each other. The RRBC is used to exchange organization data, but in aggregated form, and applies to a larger (remote) community or network. Both the PTOC and RBC circuits are shared by the platforms in a community. This sharing is accomplished by specifying opportunities at which platforms may initiate transmissions on each component of the SOC. These opportunities are called accesses and are defined such that transmissions initiated in any access will terminate before the occurrence of the next access on that component circuit. Each access on each component circuit is assigned a number from 1, ---, n. The numbers repeat periodically on each circuit, although their order will be permuted pseudo-randomly to provide AJ and LPI properties. Having selected an access number, a terminal uses that access number for its communications on each component circuit or link.

The DMSO process aims to prevent platforms within range of each other, or within range of a common receiver, from using the same access. It also includes methods for detecting and resolving these suitations when they occur. These two situations (called access conflicts) are shown in FIGS. 5A and 5B. FIG. 5A shows a direct access conflict in which two direct neighbors, or terminals T 3 and 4, have selected the same access. FIG. 5B shows an indirect access conflict in which two "indirect neighbors" (i.e. terminals T which are not neighbors, but which have at least one common neighbor in common). In this case, terminals 5 and 6, have a common neighbor terminal 7, and have selected the same access. These two types of access conflicts have the effect of jamming communications between neighboring (i.e. connected) terminals. So long as these two types of conflicts are avoided, each access can be reused by many platforms within a community or network so long as they are sufficiently distant (in terms of connectivity) from each other. This reduces the number of accesses required by the DMSO system, thereby increasing circuit efficiency. The reuse of accesses enables an SOC to support far more terminals than its accesses. Also, since terminals can reduce their effective range by narrowing their search range-gate widths, they can respond to clustering situations (in which there are more terminals than available accesses). By narrowing their search range gate, they decrease connectivity within the community, allowing greater re-use of accesses. This may create additional relay hops, but it is offset by the increased number of terminals available in a high user density environment.

If desired, a mixed operation may be provided in which a fixed set of the access numbers is administratively assigned, while the balance of the accesses are made available for automatic self-organization. In general, the SOC circuit operation provides the information for solving the system's routing problems without burdening the user's support or chain of command. The user must designate the addressee(s) only; the DMSO process will find the route and deliver the message.

The purpose of the PTOC is to facilitate NE and to distribute non-contending accesses (Blocks 101 and 102 of FIG. 4). Consider first the process of coarse net time acquisition.

Figure 7:
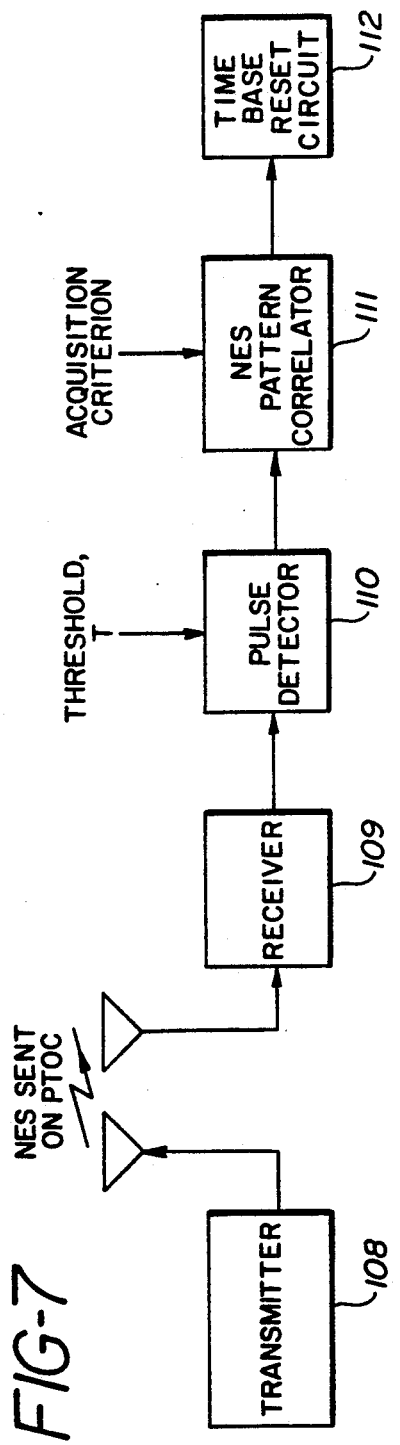
FIG. 7 is a block diagram of the equipment employed for the initial net entry search in accordance with the principles of the present invention.

For DMSO, it is presumed that a platform entering a region need not know whether a communication network exists there, or whether it will become its first member. To cover both possibilities, the first step of the DMSO process is an initial net entry search (Block 101 of FIG. 4). The purpose of this step or phase of DMSO is to enable a platform to reduce its estimate of the initial net time uncertainty to that of a range delay between platforms. The platform's terminal is activated to "receive only" and attempts to acquire an NES which has been transmitted by an entered platform on the PTOC. A small subset of accesses on the PTOC will be designated for the NE function. To perform this function, the platform would enter circuit initialization parameters, the time of day and time uncertainty, and remain in the receive search mode for some limited time. If acquisition is not obtained during this interval, the terminal can interleave periodic NES searches with periodic broadcasts of NES on the PTOC, perhaps dependent upon its role assignment, e.g., passive/active, fixed/mobile, central/peripheral, etc., and its time quality factor. If in fact, the terminal is the first member to initiate the community, and has been initialized to an NE controller role, the transmission of NES would continue. In general, however, the acquisition of the NES would cause the cessation of NES broadcasts, and at this stage coarse net time (time offset by range delay) is known to the entering terminal. FIG. 6 shows a NE access opportunity and the NES which would be transmitted at this time. Receipt of NES by the "New" platform enables coarse sync mode. FIG. 7 shows the corresponding functional block diagram of an entered platform terminal and an entering platform terminal for the initial net entry search. The entered platform incorporates a transmitter, 108, which sends or transmits an NES which consists of a sequence of pulses with known parameters: carrier frequency $f_{cj}$, inter-pulse separation $t_{ij}$, and a spreading code $C_j$. The NES pulse group is repeated at known time intervals on PTOC. The new or entering platform terminal includes a receiver, 109, which tunes to $f_{cj}$, programs a matched filter to $C_j$, and searches over twice the initial time uncertainty $\pm$ u (or 2u). The output of receiver 109 is applied to a pulse detector 110 which detects all NES pulses crossing threshold T and records TOAs. The output of pulse detector 110 is applied to an NES pattern correlator, 111, which correlates all measured TOAs with a known reference NES pattern of TOAs. The output of correlator 111 is coupled to a time-base reset circuit, 112, which establishes a coarse net time and reduces the time base uncertainty from 2u to twice the maximum range offset $2R_{AB}$. This enables the next step of the DMSO which is PTOC access acquisition and fine sync.

Since the NE accesses are only a small fraction of the total number of accesses designed for the PTOC, the remaining accesses on the PTOC will be shared among the community members. Thus, the next step in the DSMO process is for a platform to determine which of the remaining accesses are taken and which are available for its own use. This requires the monitoring of the state of these accesses which shall be designated as RTT accesses.

The signals used for this purpose are called RTT messages and can be either concentrated (TDMA) or distributed (DTDMA). These signals are also used to determine range to other local terminals and to support a fine synchronization function. These messages comprise both RTTI and RTTR. The use of RTTs has been selected because their exchange rate is normally required to be proportional to the dynamics of the community. If, for example, the community or network is static or known to be non-moving, it is not necessary to continue the repetition of RTTs which provide no new information. As individual users or platforms begin to move, the required frequency of RTT exchanges is in proportion to the velocity or acceleration rates involved. These requirements exist independent of any implementation of DMSO. DMSO simply utilizes these existing requirements to provide additional functionality.

Access acquisition in a TDMA architecture is shown in FIG. 6 where an RTTI message would be transmitted early within a slot access interval and an RTTR message would be transmitted later in the same slot access interval. To determine the available accesses, the entering platform searches the RTT accesses of the PTOC for "taken" accesses. A search window of twice the maximum range uncertainty is used for these searches. For those accesses in which synchronization signals or preambles have been detected in the early portion of a TDMA slot, the access numbers and the TOA of the signals are recorded by the entering (receiving) terminal. The synchronization signals or preambles mentioned above may be synchronization preambles of RTTI from other entering platforms, or merely synchronization preambles which are transmitted to indicate that the access is still being used by entered platforms. A roster is maintained of these Taken Access Numbers of Direct neighbors (TAND's). It is noted that the state of coarse synchronization enables a platform to receive from other entered platforms but does not permit it to transmit. This case is illustrated in FIG. 6 where it is shown that the new entering platform receives an RTTI transmitted by member A at its OAN, Access 6.

Figure 8:
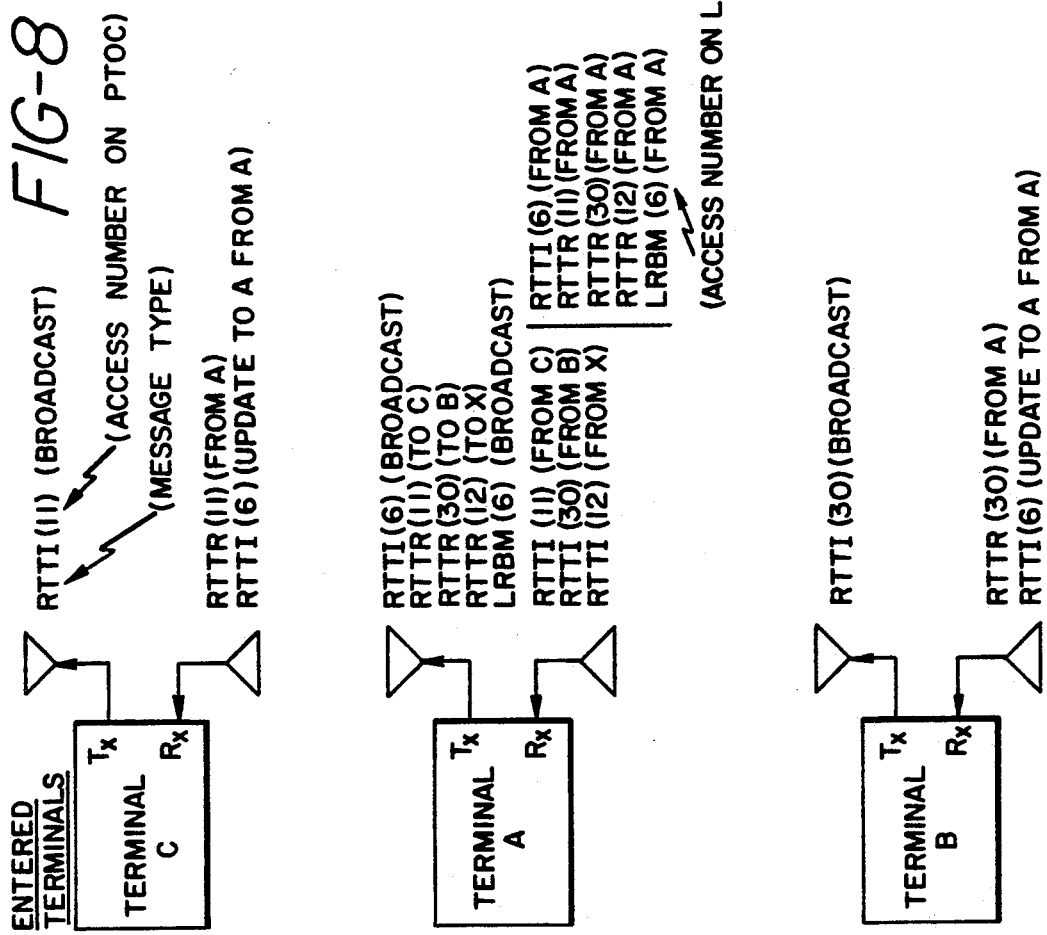
FIGS. 8 and 9 are block diagrams illustrating the message exchange for access acquisition in accordance with the principles of the present invention.
Figure 9:
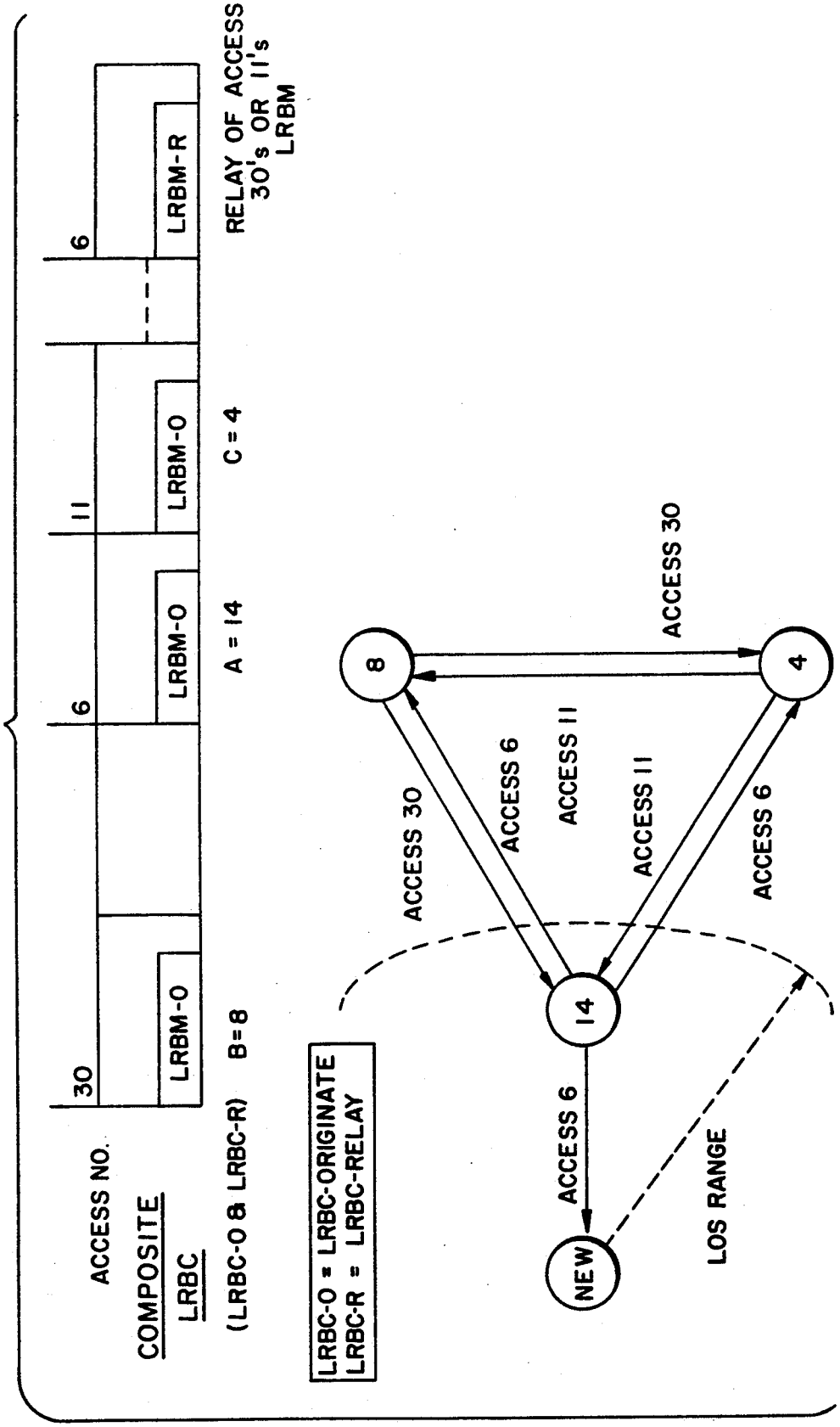

For those PTOC accesses, such as access 30 in FIG. 6, in which the new platform cannot receive the RTTI, the search continues to try to detect a RTTR in the same access. If the RTTR in this access is received, the new platform confirms that this access has been taken by a TANI neighbor or platform (i.e., a platform which can reach the receiving terminal via a single relay from the transmitting terminal). In FIG. 6, the RTTR in access 30 is A's response to B's RTTI, which A had received. A roster also is maintained of all TANIs and the TOAs of the signals. After monitoring the state of all the PTOC accesses, those accesses which are not TANDs or TANIs are deemed to be Available Access Numbers (AAN). The new entering platform selects its OAN randomly from this AAN roster. FIGS. 8 and 9 show the message exchange for the connectivity as depicted in FIG. 6.

Before attempting to achieve active fine net time synchronization, the entering platform continues to operate in the "receive" mode to learn additional information about the community. Associated with every PTOC access number is a corresponding access number on the LRBC as shown in FIG. 9. The "owner" of an LRBC access transmits a LRBM which contains useful organization information such as user ("owner") identity (ID), user's selected access number(s) (a platform may select more than one access, depending on its role), user's position, user's time and position quality factors, user's roster of conflicting accesses, user's roster of platform identities received directly, (measured) incoming link reliabilities, user's traffic loading, user's operational circuits, and other data which is useful for routing to extended communities. The LRBM information received is maintained and updated in the entering platform's own access-identity roster and data bases. The latest received information is considered valid.

Having selected an OAN consistent with its monitoring of the PTOC and LRBC, the entering platform must now achieve fine net time synchronization. Its terminal must then be activated to "transmit" at its selected OAN on the PTOC. Referenced to its own perception of net time, it transmits a RTTI at its selected platform's OAN. Since the IDs and time quality factors of direct neighbors are known from the LRBM receptions, the RTTI can either be addressed to a platform with a time quality greater than its own, or it can be addressed to a terminal with a preferred value of time quality. This transmission is interpreted as an RTTI by any terminal which receives it. Receiving terminals automatically mark the corresponding access as a TAND. After transmitting the RTTI, the entering platform continues to monitor its OAN access for reception of an RTTR. On receipt of an RTTR, it can correct its coarse net time offset using the TOA of the RTTI at the replying platform (contained in its RTTR), the known reference transmission time within any access for the RTTR, and the measured TOA of the RTTR.

Repeating the RTTI-RTTR exchange with several active entered platforms, allows the entering platform to weight the net-time error signals in accordance with source time-qualities. This procedure will adjust the entering platform's own net time toward a value which is the community's best collective estimate of system time. In addition, the entering platform updates its own time quality with measured TOAs and received quality factors. Upon successful completion of a fine net entry, the "entering" platform is now an "entered" platform, and operational data/voice circuits may be activated. The newly entered platform will also commence the transmission of LRBMs, at its selected OANs on the LRBC, providing information for new and active platforms to utilize in updating of their ID-access rosters and continued self-organization. Note block 115 of FIG. 4.

It is further pointed out that a passive fine net time acquisition mode can be supported by this self-organization circuit, a mode useful to EMCON (Emission Control) terminals. In this mode, range to other platforms is derived from broadcast position data on the LRBC and from its own position and initialization data. Also, range to other platforms is measured from the TOA of received messages. Both of these range values are compared and differences are used to adjust fine network time. The resultant accuracy of network time is determined by the accuracy of the position data and by the geometric distribution of participating platforms. This mode operates best if the initialization quality of position is higher than the equivalent time initialization. When time quality is higher than position quality, then Kalman filtering of position and TOA data can be used to improve position quality.

Figure 10:
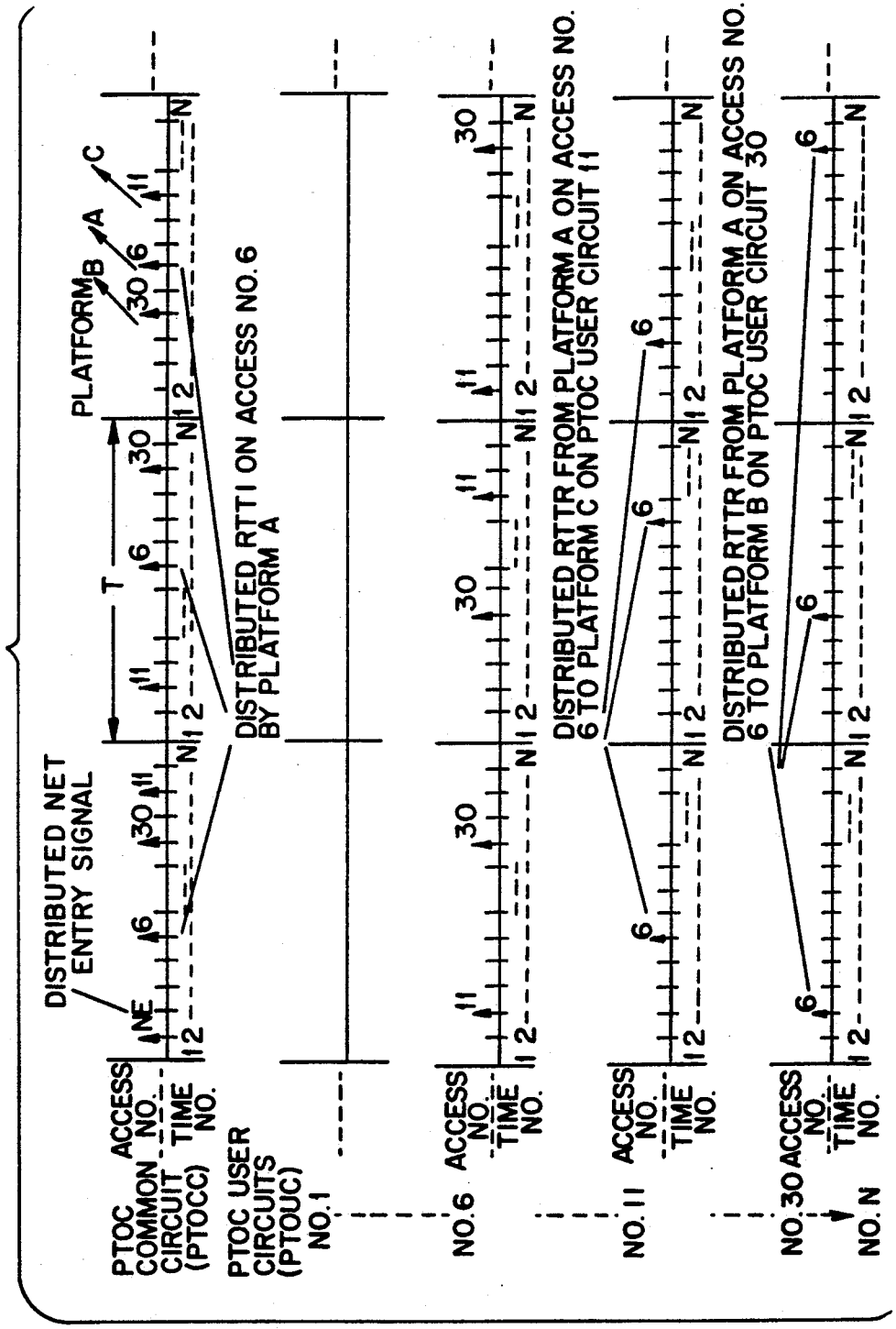
FIG. 10 is a set of waveforms illustrating the access acquisition by an entering platform employing a distributed time division multiple access architecture in accordance with the principles of the present invention.

FIG. 10 is a diagram showing the signalling which the new terminal would monitor in order to enter and join a network if a DTDMA circuit architecture was used. In this arrangement, NE, RTTI, and RTTR signals (pulses) are distributed in time, rather than concentrated within a time slot interval as shown in FIG. 6. The PTOC is also divided into two portions, a PTOCC and PTOUC. The PTOCC is divided into N accesses, with a small subset used for the initial net entry function, where N would be selected to be commensurate with the size of the local community of interest and is used for transmitting RTTIs. There are N PTOUCs, each identical in structure to the PTOCC. The $i^{th}$ PTOUC is used to transmit RTTRs in response to RTTIs received at the $i^{th}$ access on the PTOCC. A terminal always uses its OAN(s) to transmit RTTRs regardless of which PTOUC it is using.

The first step which the new entrant takes is searching for distributed net entry signals on the PTOCC. The acquisition of this signal achieves coarse synchronization and permits the new platform to properly identify the sequence of pseudo random circuit access numbers on the PTOCC. As with the TDMA implementation, if no NES is detected then the new entrant would assume the role of the NE controller and transmit the NES at the NE accesses. The next step, assuming an NES was detected, is to search the remaining (N−1) accesses (at most) to see which have been selected by direct or indirect neighbor platforms. Those accesses taken by platforms in direct line-of-sight range of the new entrant are determined by searching and acquiring the distributed RTTI signals which are transmitted on the PTOCC at the time of the pseudo-random pattern of a particular access number. These accesses are called TANDs. In FIG. 10, access number 6 is an example of a TAND taken by Platform A, assuming the same connectivity as illustrated in FIG. 6.

In general, a set of platforms will be received on their taken accesses and these platforms define the community in direct range of a new net entrant. Indirect neighbors are determined by means of the PTOUCs. The PTOUC consists of a set of N component circuits, with each component divided in N accesses. Each PTOUC is identical in structure to the PTOCC. The PTOUCs are used for transmitting RTTRs. Each PTOUC is associated on a one-to-one basis with the PTOCC access number used for broadcasting a RTTI. It is on that corresponding PTOUC that a platform receives RTTRs to its interrogations on the PTOCC. For example, if a platform selected access number 6 on the PTOCC to broadcast its interrogations, that platform listens for replies to those interrogations on PTOUC 6.

Furthermore, since a terminal uses the same OAN(s) to transmit on any component of the PTOC, it will transmit RTTRs at its OANs on the appropriate PTOUC. Thus, if a platform selected access number 30 on the PTOCC, it will also use access number 30 to transmit RTTRs on the PTOUCs corresponding to the accesses on which it receives RTTIs.

In summary, a platform's selection of an access number on the PTOCC to broadcast interrogations determines the number of the user component circuit that this platform will use to receive replies to its own interrogations and it also determines the access number that this platform will use to transmit replies to others on their associated PTOUC.

Returning to the access acquisition process, the platforms of the new entrant's direct range community are also transmitting RTTRs on the PTOUC. These are replies to the interrogations received on the PTOCC. Thus, the new entrant can derive indirect evidence of the access selections of platforms which are its direct neighbors by scanning and monitoring the components of the PTOUC which are used for the transmission of reply signals by platforms which are in direct range. For example, in FIG. 6, two Platforms B and C exist beyond LOS of the new entrant but within LOS of Platform A. They have selected access numbers 30 and 11, respectively. Platform A, which is within LOS of Platform B and C, has selected access 6. Thus, A transponds to B on PTOUC number 30 at access 6 and it transponds to C on PTOUC number 11 at access 6, as depicted in FIG. 10. By recognizing access 6 activities on these PTOUCs, the new entrant determines that accesses 11 and 30 are TANIs.

Through this process, the new entrant compiles access information for a two-level area surrounding its position. The difference between the total complement of accesses (N) and those accesses determined to be taken by either direct or indirect evidence are the AANs. By selecting one of the AANs and commencing the transmission of its own broadcast interrogations at this access on the PTOCC, the new entrant can achieve fine net synchronization. The process is illustrated in the timing diagram of FIG. 11.

Figure 11:
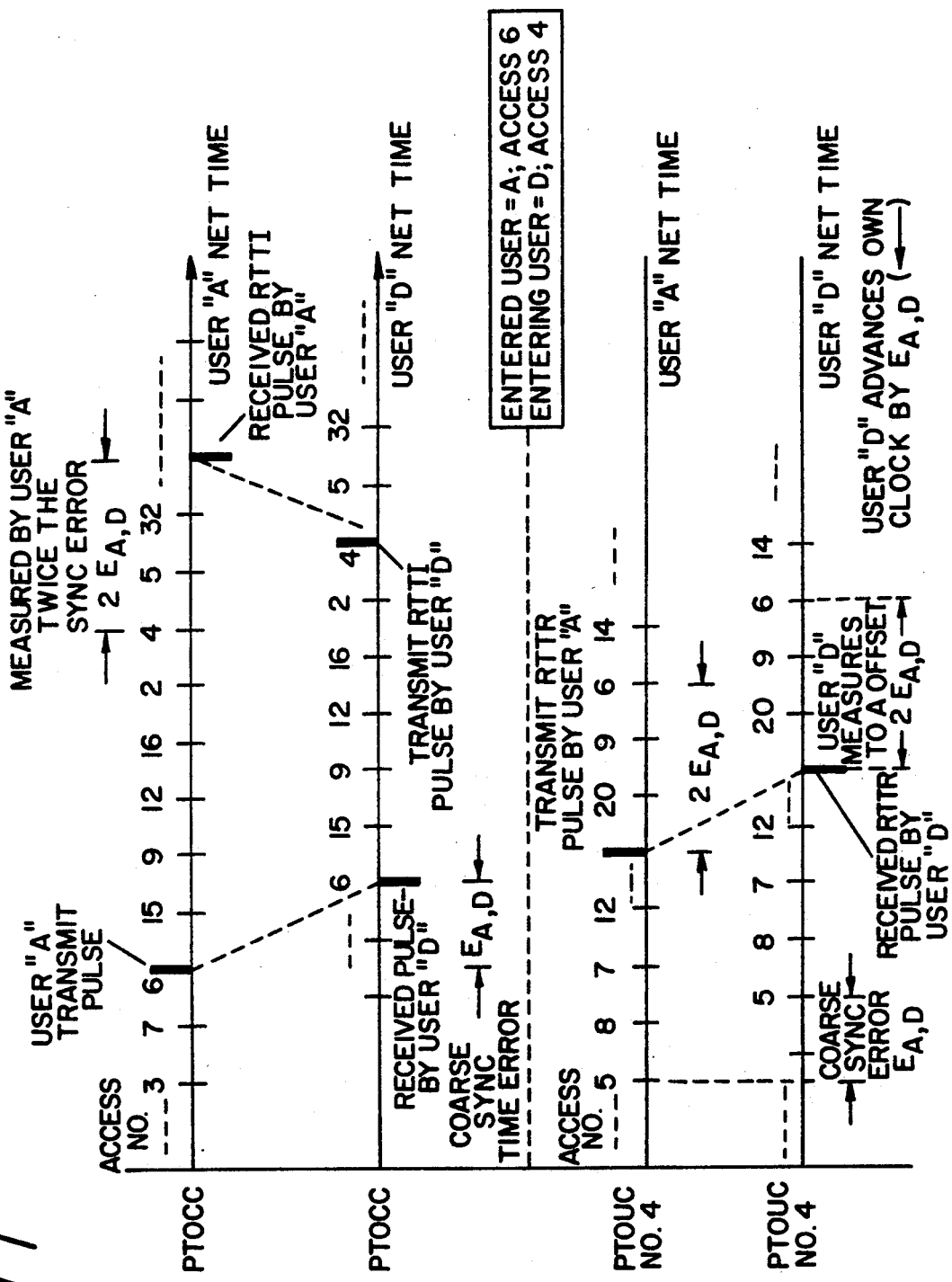
FIG. 11 is a set of waveforms illustrating the fine net time synchronization with distributed round trip timing signals in accordance with the principles of the present invention.

In FIG. 11, platform A using PTOCC access number 6 is an entered platform in the network with adequate time quality to be a time reference for new entrants. Platform D is presumed to be an entering platform having just completed its initial net entry and access monitoring functions and has selected access number 4 for its own. The object of fine synchronization is to remove the initial net entry coarse synchronization error $E_{A,D}$. The upper half of FIG. 11 shows this time offset and also platform D's RTTI transmission and access number 4. For clarity only one pulse is shown of a distributed sequence of pulses associated with the update rate of access number 4. Since platform A is in direct range of platform D, it can receive platform D's transmission, and measures these RTTI receptions at an offset of twice the synchronization error $E_{A,D}$ from the timing of access number 4 events on its own network clock. In order to enable platform D to remove this time base error, as shown in the lower half of FIG. 11, platform A transmits a distributed RTTR on PTOUC number 4 which is offset from its access number 6 event times by 2 $E_{A,D}$, the offset platform A measured on the PTOCC. After receiving platform A's RTTR, platform D measures the time offset between this TOA and platform A's access number 6 event time on its own time base. Platform D then adjusts its network clock by half of this measured offset which brings its clock in synchronism with platform A's network clock. In general, platform D repeats the above measurement with several directly connected platforms and weights the net-time, error signals in proportion to the time quality of their source. As discussed previously, this information is received on the LRBC. This moves the community network time towards a value which is collectively the communities best estimate of system time. The information transfer required for a DTDMA architecture is the same as that shown in FIG. 8 for TDMA, but the signal structures are different, i.e. distributed signals versus concentrated signals or bursts.

The utility circuits used to propagate local and remote platform identities, connectivities and link reliabilities, etc., are collectively called the RBC. The RBC has two components: an LRBC, and an RRBC. The LRBC itself has two components, an LRBC-0 for originating messages and an LRBC-R for relaying them. The RBC is used solely for transmitting data pertinent to the self-organization process. Circuit designs for all components are similar to that shown in FIG. 9. Circuits for TDMA and DTDMA architectures would differ only in the overall duration of the access interval and the dispersion of the message symbols within the interval.

The LRBC is used for the transmission and propagation of LRBMs. LRBMs are originated by each platform at its LRBC-O access(es) as shown in FIG. 9. The LRBMs contain data useful for the self-organization process, e.g., IDs, transmit/receive loadings, link reliability, etc., as described herein. An LRBM is relayed once by each platform which receives it (whether from the originator or from a previous relay) until it is a given distance (in hops) from the originator. The LRBMs are relayed on the LRBC-R circuit using the relaying platforms own accesses. Relayed versions of the message omit the access information but add the relay hop count.

LRBC messages are the source of all information used in the routing process. RRBC messages are constructed from information originally found in LRBC messages. LRBC messages contain only that information which is known directly by its originating platform, i.e., its ID and position, its transmit/receive load, its own accesses, the access conflicts it has detected, its direct incoming neighbors and the measured reliability of their incoming links. By limited flood routing of the LRBMs as described above, this information can reach the terminals to which it is most important. By reporting, propagating and using only explicitly known, observed, and measured information, platforms need not infer the status of their and others' outgoing links from the measured/reported quality of incoming links. Such references are not desirable in a jamming environment, because the existence of incoming link does not imply even the existence of an outgoing link, let alone its quality. In order for a platform to make sound routing decisions, it must receive reports of the existence and quality of its outgoing links. Similarly, it must transmit a report of the existence and quality of its incoming links in order that it can be reached, either as a destination or as a relay. Where unidirectional links exist, these reports must themselves traverse a multi-hop path.

From the transmissions by each platform on the LRBC-O and the relaying of these messages no more than a given number of hops on the LRBC-R, each platform can construct a connectivity-link quality matrix of the entire local community based upon these received LRBM's (both original and relayed). Note: Block 116 of FIG. 4. FIG. 12 shows a small example of this matrix. For clarity, the matrix entries are shown restricted to 0 and 1. An asymmetric matrix would indicate some unidirectional links. More generally, link reliability or some other cost function would be entered in the cells of the matrix. There are three major factors which should be incorporated in the formation of a "cost function". These factors reflect on: (1) the reliability of the links; (2) the number of links for a path from source to destination; and (3) the platform loading of selected relays. Qualitatively, for this type of generalized cost function, the reliability of a route (set of links) is weighted by the number of links (effects delay) and the loading of the relays along the path.

Each platform derives all local connectivity information from LRBMs received from neighboring platforms and uses it to update its connectivity matrix. Platforms use their connectivity matrix to generate costs and routes to local platforms. These costs are used, in turn, to generate and evaluate RRBMs. Note: Blocks 117, 118, 119 and 120 in FIG. 4.

The cost function can also be used to provide several degrees of security control. Two primary levels of security control are COMSEC and TRANSEC. Platforms which are provided the code keys only for TRANSEC are capable of transmitting and receiving signal waveforms (e.g. spread spectrum, frequency hopped, etc.) but are denied the capability for encryption/decryption of the messages. Platforms which are provided the code keys for TRANSEC and COMSEC can fully participate in both the transmission and reading of messages. Terminals denied both TRANSEC keys and COMSEC keys of a network are incapable of any participation. Thus, by choice, a platform can be designated as either: (1) a circuit participant relay (TRANSEC and COMSEC),(who can both relay and understand messages), (2) a non-participant relay (TRANSEC only), (who can relay messages without understanding them), or (3) an ineligible relay (neither TRANSEC and COMSEC).

Platform terminals of type (2) can facilitate message delivery between circuit participants through relaying but cannot read the information content.

From the DMSO derived connectivity matrix and using a point-to-point routing algorithm (e.g., Dijkstra's algorithm) each platform can derive optimal point-to-point routes to all receivers in the matrix by computing a minimum cost routing tree. Note: Block 121 in FIG. 4. Dijkstra's algorithm is fully disclosed in the following article, "A Note on Two Problems in Connection with Graphs" Numer. Math, Vol. 1, pp 269-271, 1959.

Figure 13:
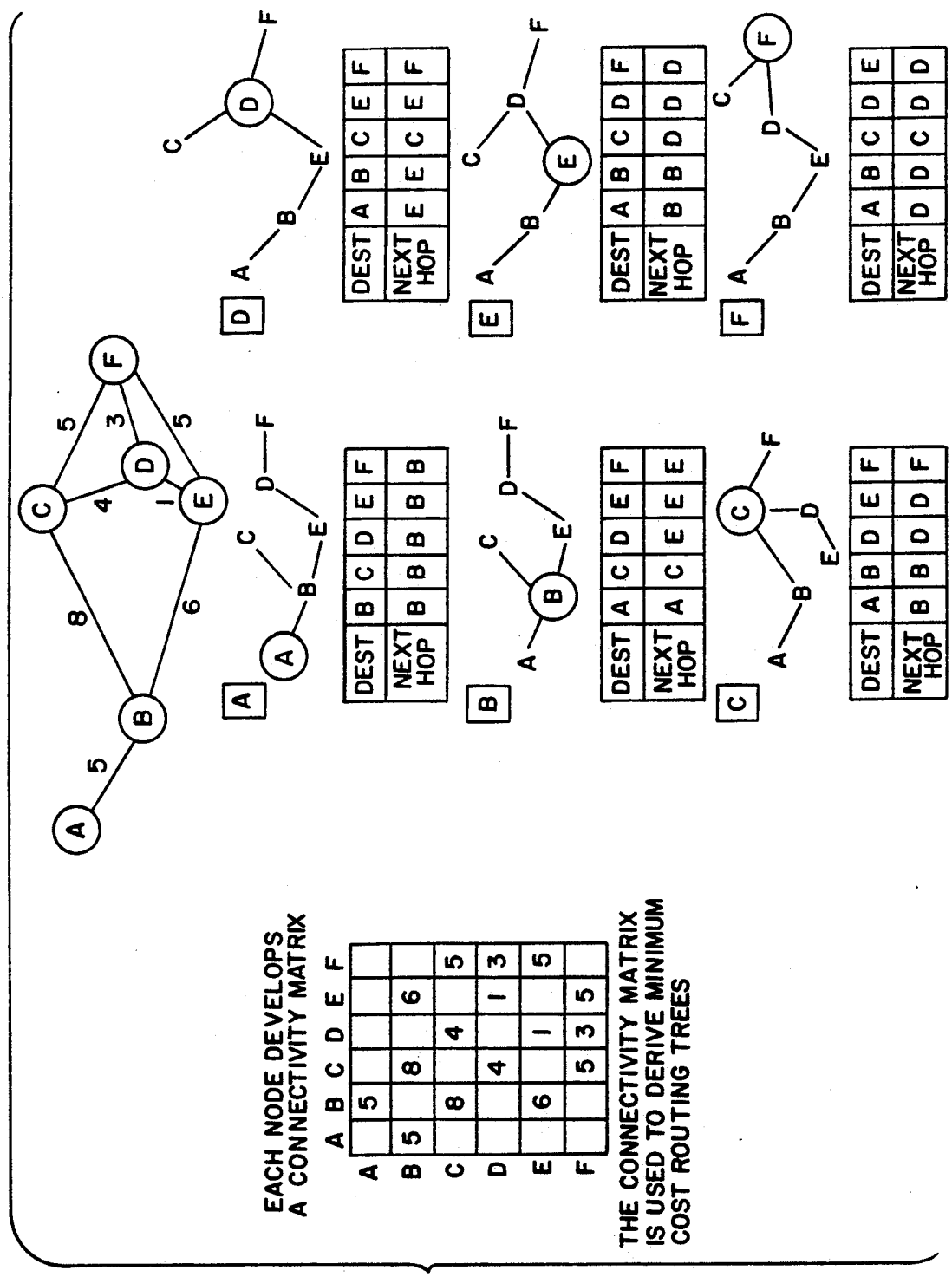
FIG. 13 is a diagram of an example of a point-to-point routing decision using Dijkstra's algorithm in accordance with the principles of the present invention.

Using these trees, platforms distributively route messages one hop at a time. As an example, FIG. 13 shows a small six node network with assumed link costs in the connectivity matrix. FIG. 13 also shows the optimal routing trees for each platform which define a least cost route to every other connected node. The Dijkstra algorithm constructs the routing tree one node at a time, starting with the originating platform and adding one destination at a time, always selecting the closest (i.e., least cost) destination not already on the tree.

Dijkstra's algorithm and LRBMs as described above are sufficient to handle route determination in any network. As a community grows in size, however, the algorithm becomes increasingly unwieldly. Dijkstra's algorithm requires each platform to have full knowledge of the entire community (i.e., all ID's, all links, all link reliabilities, etc.). An increase in the size of the terminal community leads to an increase in each terminal's storage, communications, and processing requirements.

Intuitively, as the number of platforms increases, the utility of explicit knowledge of the connectivity and link reliabilities among distant platforms decreases. To exploit this fact a truncated version of Dijkstra's algorithm has been developed to reduce the rate at which storage, communications, and processing requirements increase, with minimal impact on the optimality of the routing process. Under the DMSO truncated Dijkstra algorithm, platforms originate messages describing their incoming connectivity. Rather than being propagated to the entire community, however, they are propagated only to a fixed radius (in hops) about the originator. Each platform is therefore able to develop a local connectivity matrix and, from that, a truncated routing tree, giving costs and routings to all platforms within that radius. These platforms are referred to as local platforms. Platforms beyond this radius are referred to as remote platforms. In addition to its LRBM connectivity message, a platform generates a new message which lists all platforms, local and remote. For local platforms, it reports its computed cost to them; for remote platforms, it reports one of its local platforms as a predecessor to that remote, along with the cost from that predecessor to the remote (this information is derived from received messages from its direct incoming neighbors). This transmission is not relayed, but is used to update the databases of the originating platform's outgoing neighbors. A terminal can then route messages to its local platforms as if it were using the standard Dijkstra algorithm. For remote terminals, it routes the messages to its local predecessor and leaves further routing to the subsequent terminals.

Figure 14:
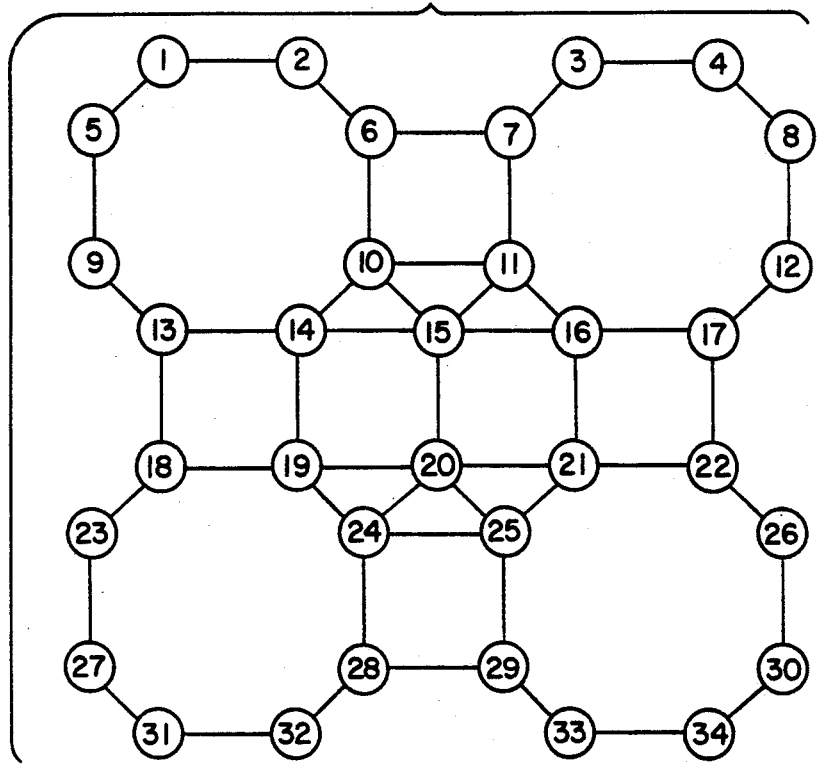
FIG. 14 is a diagram illustrating a thirty-four platform network with connectivity in accordance with the principles of the present invention.
Figure 15:
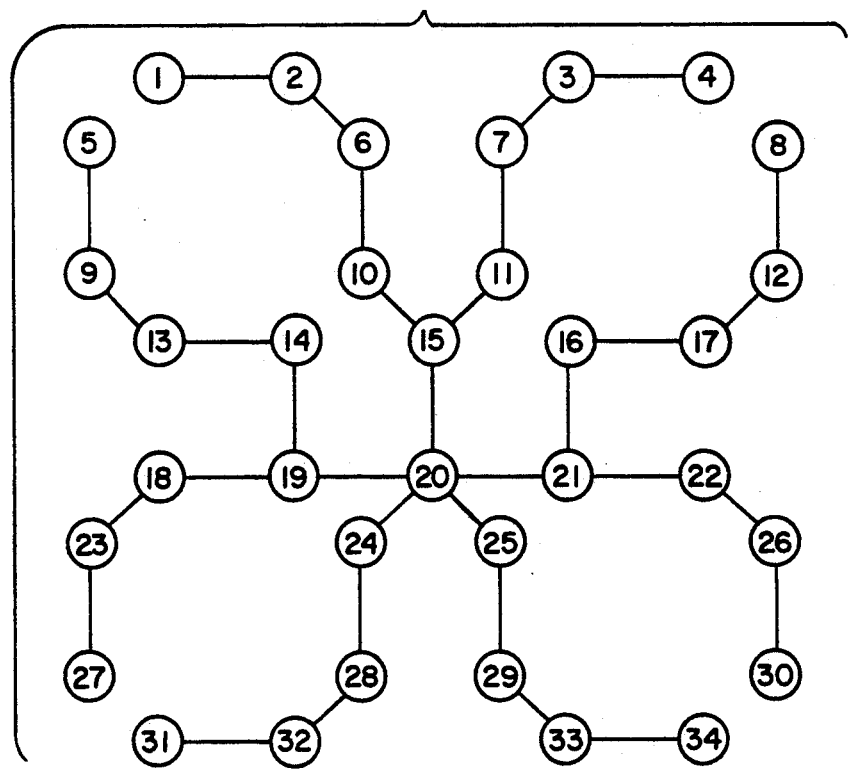
FIG. 15 is a diagram illustrating a minimum cost routing tree for platform 20 of FIG. 14 based on full connectivity employing Dijkstra's algorithm in accordance with the principles of the present invention.
Figure 16:
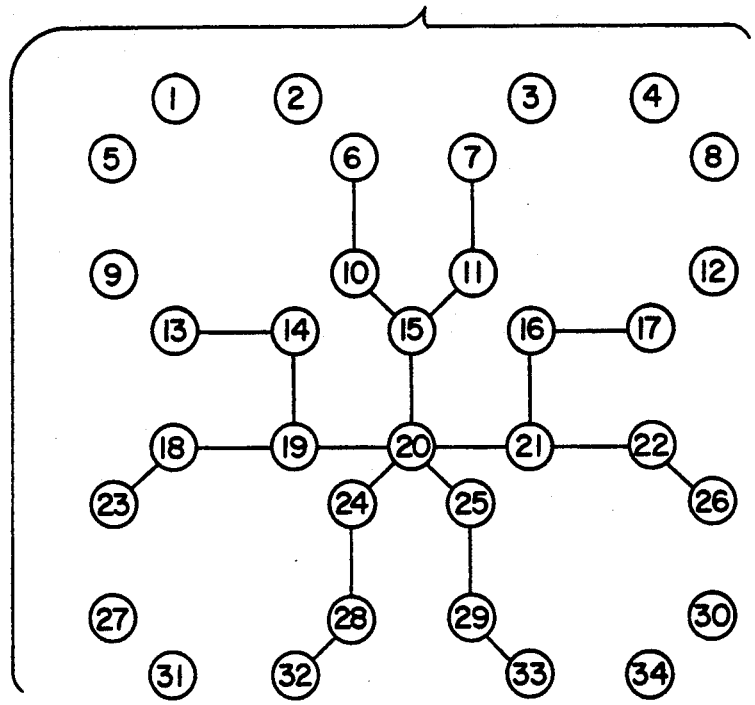
FIG. 16 is a diagram illustrating a routing tree for platform 20 of FIG. 14 employing a truncated Dijkstra algorithm in accordance with the principles of the present invention.
Figure 17:
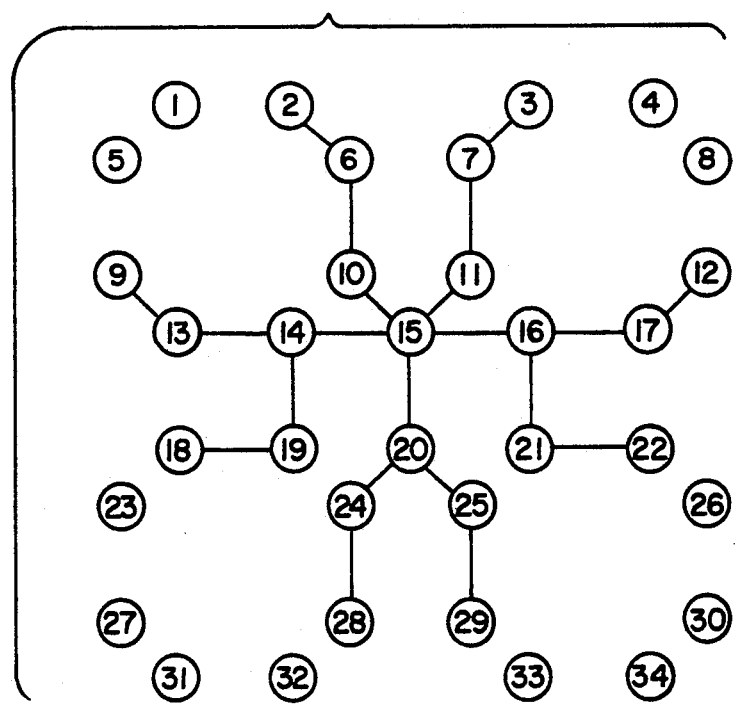
FIG. 17 illustrates a routing tree for platform 15 of FIG. 14 employing a truncated Dijkstra algorithm in accordance with the principles of the present invention.
Figure 18:
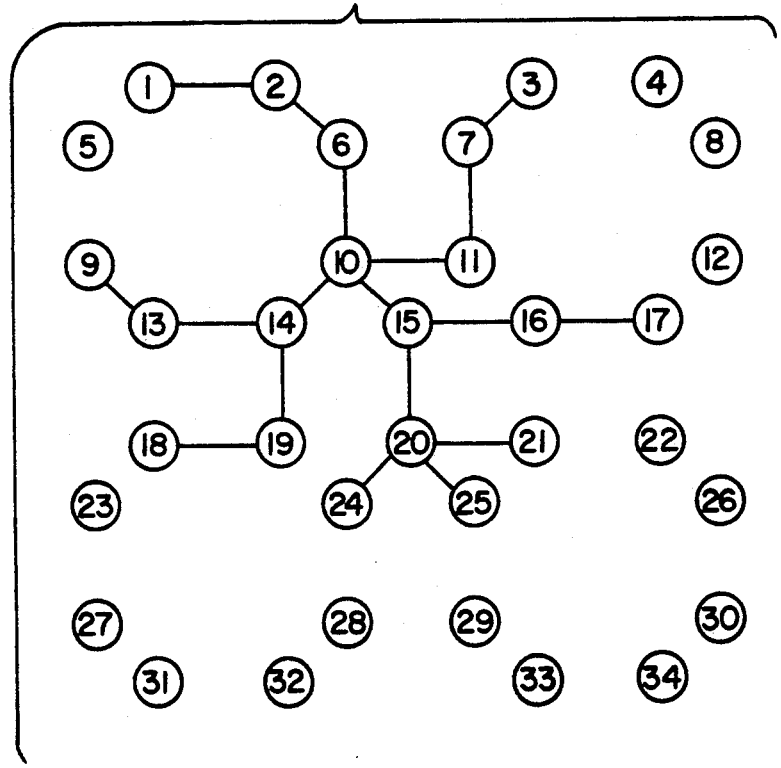
FIG. 18 illustrates a routing tree for platform 10 of FIG. 14 employing a truncated Dijkstra algorithm in accordance with the principles of the present invention.

FIGS. 14 through 19 illustrate this process. FIG. 14 shows an arbitrary network of thirty-four platforms and their connectivity. If cost is assumed to be proportional to link length, a minimum cost routing tree, such as that shown in FIG. 15, could be constructed for platform 20 using Dijkstra's algorithm. If connectivity is propagated to only a three link radius, platform 20 would still be able to develop the truncated routing tree shown in FIG. 16. FIGS. 17 and 18 show the comparable truncated routing trees for platforms 15 and 10. Finally, through exchanging information on remote terminals with its neighbors, platform 20 would be able to develop a structure similar to that illustrated in FIG. 19. This structure provides a means to route to any local or remote terminal. For example, to reach terminal 8, terminal 20 would forward the message to terminal 16, via terminal 21. Link costs are assumed to be either 1 or 0.7 depending upon their lengths in FIG. 19.

Platform implementation of the truncated Dijkstra algorithm requires an additional RBC circuit, the RRBC. As previously discussed, the LRBC is used to propagate knowledge of a platform's incoming links. In a standard implementation of Dijkstra's algorithm, LRBMs are relayed until they have reached every platform in the community. Each platform can then use the derived connectivity matrix to perform Dijkstra's algorithm and derive a least cost routing tree to every other platform in the community. Under the truncated Dijkstra algorithm, LRBMs are propagated until they have reached all terminals within a given radius (in hops) of their originator. Each terminal then uses the derived local connectivity matrix to perform Dijkstra's algorithm and derive a least cost routing tree to all terminals in the local community.

The RRBC is simply a utility circuit designed to carry RRBMs. As with all of the other SOC component channels, the RRBC is divided into accesses, corresponding to those on the PTOC and LRBC which determine when a platform will originate an RRBM. Unlike LRBMs, RRBMs are not relayed. Each terminal condenses the information received from all incoming RRBMs, evaluating, for example, each neighbor's predecessor to a given remote. It then combines the results of this process and the results of its own local route determination process to formulate its own RRBM.

An RRBM contains the ID of an originator followed by a list of the IDs of the platform on its local routing tree. Included with the ID of each local platform is the cost of the route from the originator to the local platform. If the originator has designated the local platform as a predecessor to any remotes, the IDs of these remotes follow, along with the route cost from the predecessor to the remote, as shown herein below and derived from FIG. 19.

```
I am node 20
    Node 15 is on my routing tree
    My cost to node 15 is 1
        Node 15 is a predecessor to node 2
        Its cost to node 2 is 2.4
        Node 15 is also a predecessor to node 3
        Its cost to node 3 is 2.4
    Node 10 is on my routing tree
    My cost to node 10 is 1.7
        Node 10 is predecessor to node 1
        Its cost to node 1 is 2.7
    Node 6 is on my routing tree
    My cost to node 6 is 2.7
    Node 11 is on my routing tree
    My cost to node 11 is 1.7
        Node 11 is a predecessor to node 4
        Its cost to node 3 is 2.7
    etc.
```

Long RRBMs can be broken down into shorter messages, each containing some of an originator's local platforms along with their remotes. Whereas LRBC messages contain parameters used to compute link/route cost (i.e., link reliability and terminal loads), RRBM's contain the computed costs.

Figure 19:
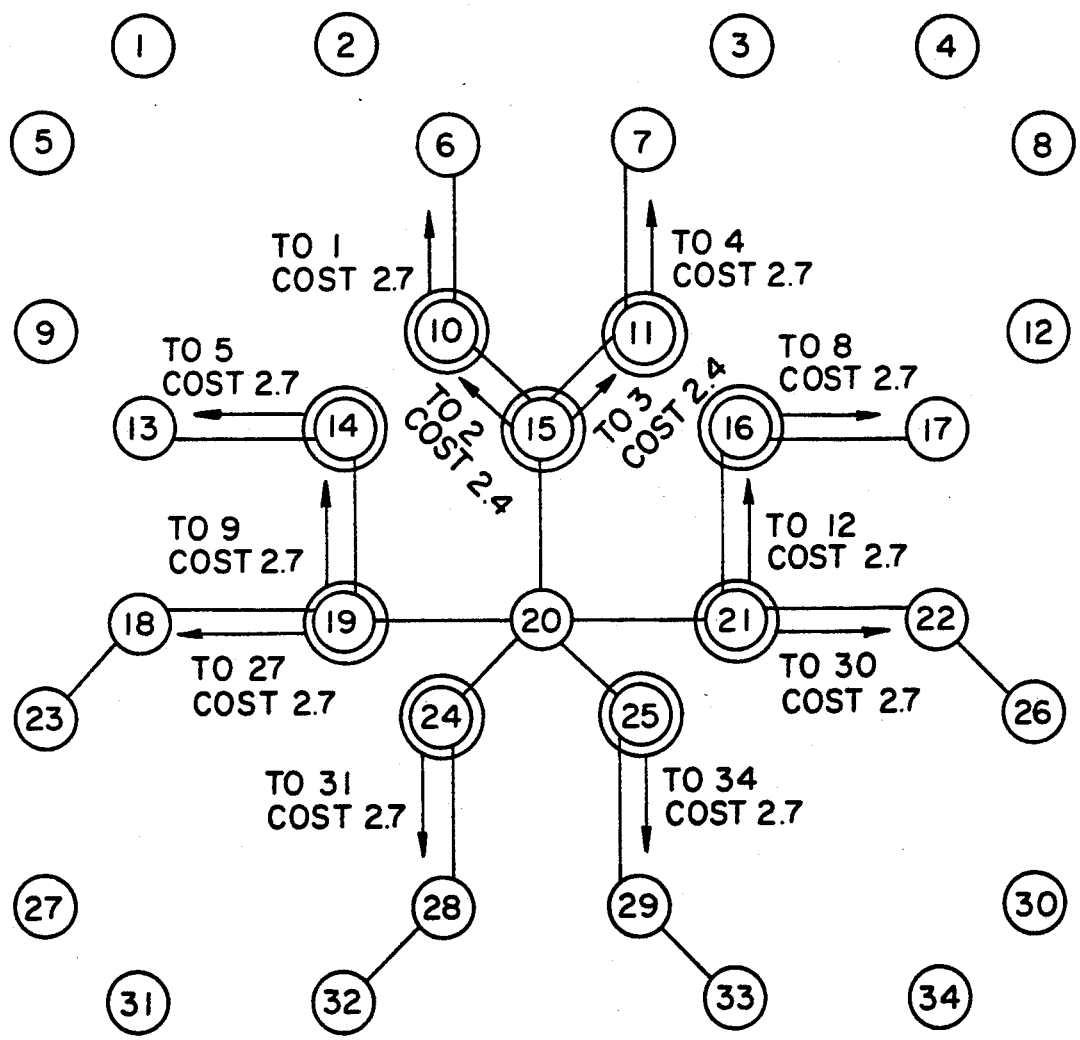
FIG. 19 is a diagram of a routing tree for platform 20 employing a truncated Dijkstra algorithm illustrating the remotes and their predecessors in accordance with the principles of the present invention.

Data selected from incoming RRBMs is stored in a remote connectivity table shown herein below which is derived from the previous example of FIG. 19.

| REMOTE ID | PREDECESSOR ON TREE | COST FROM PREDECESSOR TO REMOTE |
|---|---|---|
| 1 | 10 | 2.7 |
| 2 | 15 | 2.4 |
| 3 | 15 | 2.4 |
| 4 | 11 | 2.7 |
| 5 | 14 | 2.7 |
| 8 | 16 | 2.7 |
| 9 | 19 | 2.7 |
| 12 | 21 | 2.7 |
| 27 | 19 | 2.7 |
| 30 | 21 | 2.7 |
| 31 | 24 | 2.7 |
| 34 | 25 | 2.7 |

A receiving platform updates its remote connectivity table based on RRBMs originated by its incoming neighbors. The receiver will examine each of the originator's local platforms as well as its remotes (assuming that the originator or that local platform is on the receiver's local routing tree). Of these platforms, the local or remote platforms which are on the receiver's local routing tree will generally be ignored. Platforms not previously known to the receiver will be added to the receiver's remote connectivity table with their predecessor set to either the predecessor designated by the originator (if it is on the receiver's local routing tree), or the originator itself (otherwise). For remote platforms already known to the receiver, their recorded cost is compared to the cost reported through the originator's local community. The receiver's cost and predecessor entries are updated as necessary. Generation of RRBC messages is simply a matter of broadcasting the local routing tree merged with the remote connectivity table.

Under DMSO, communications messages are routed towards their destinations one relay hop at a time. Since each platform develops routing information for every destination, an originator need not rely solely on its own information to determine a message route. In fact, since connectivity information propagates outwords from a destination, it is best to allow routing to be guided by platforms close to that destination.

Figure 20:
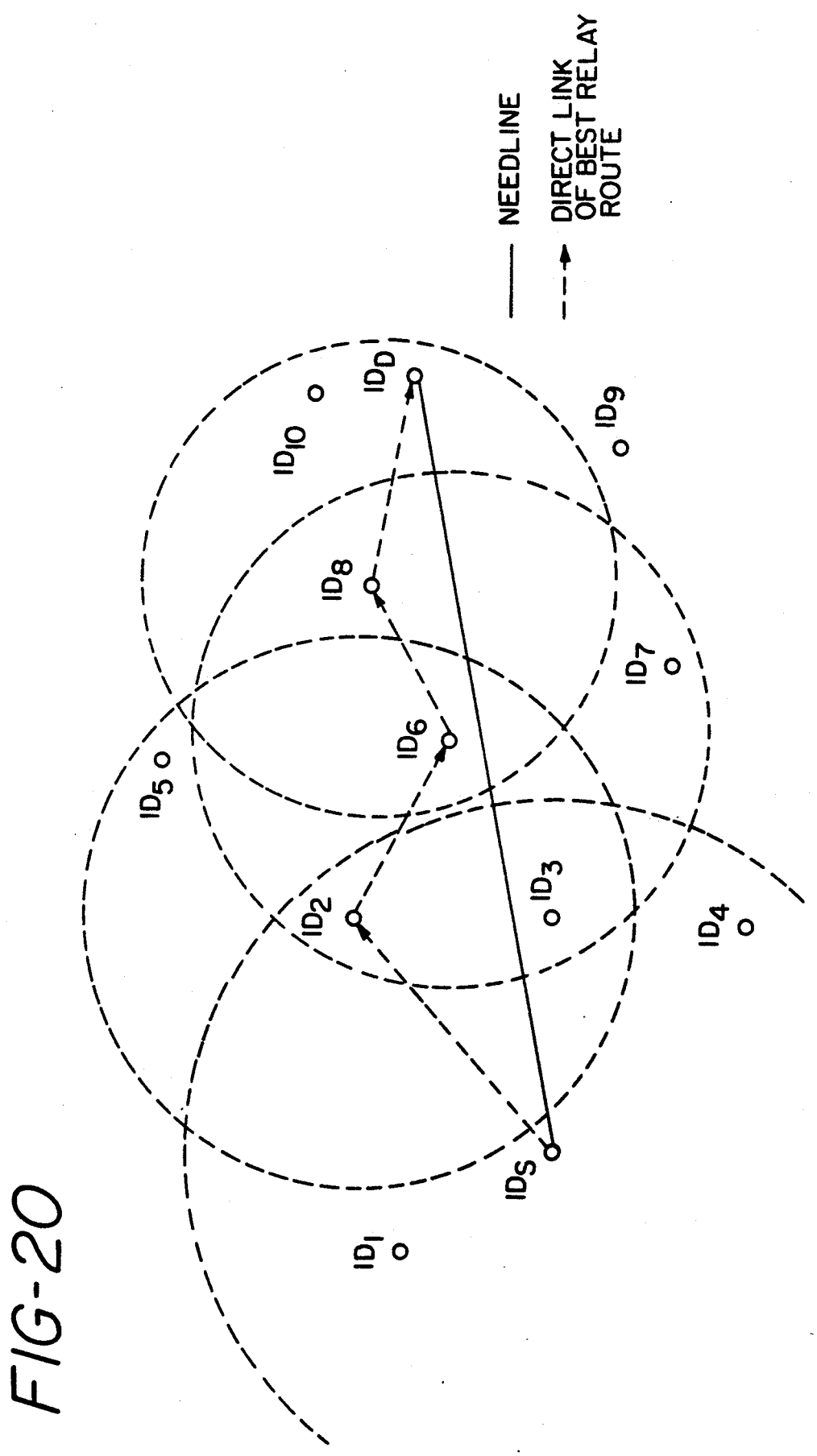
FIG. 20 is a diagram illustrating the routing of a message using the truncated Dijkstra algorithm in accordance with the principles of the present invention.

An originator or relay thus sends a message off in the right direction and leaves subsequent routing to relays down the line. Depending on whether the destination is a local platform or a remote, an originator or relay will search its routing tree for either the destination, or the destination's predecessor, and will determine the first hop on the route to that platform. It then broadcasts the message specifying the ultimate destination and the next hop. A platform receiving a message listing itself as the next relay repeats the above process. If it is the destination, of course, no further relaying is required. If the terminal is neither the next hop, nor the destination, it ignores the message. FIG. 20 illustrates the distributed routing process. Note Blocks 122, 123, 124 and 125 of FIG. 4.

Previous routing discussions focused primarily on point-to-point communications in networks of low to medium connectivity which are typical characteristics, for example, of Army ground deployments. Other applications, e.g., Navy and Air Force communications, require, in addition, point-to-multipoint (multicast) routing, and in the limit broadcast routing. Note blocks 126 and 127 of FIG. 4.

To overcome the deficiency of flood routing as described under the heading "BACKGROUND OF THE INVENTION", a DMSO connectivity-based relay point-to-multipoint algorithm has been developed having the following objectives: (1) to deliver messages from an originator to all destinations over minimum hop paths, (2) to do so using the fewest number of relays or transmissions, and (3) to do so in a distributed fashion. The goal of finding the best route to each destination is sacrificed somewhat in order to take advantage of the efficiencies of broadcast transmission.

In order to perform point-to-multipoint routing using this DMSO algorithm, a terminal requires a path length matrix including at least the intended destinations and all prospective relays. A path length matrix, $P_{ij}$, is defined by $P_{ij}$=length of the minimum hop path from Terminal i to Terminal j, if such a path exists; $P_{ij}$=0, if i=j, and $P_{ij}$=infinity if no path exists from i to j. The path length matrix can be derived from a connectivity matrix by using Floyd's algorithm disclosed in the article, "Algorithm 97-Shortest Path" in Communications of the ACM 5, page 345, 1962.

Using a path length matrix, a terminal can determine which of its outgoing neighbors are prospective first relays on a minimum hop path to each destination. In general, for an originator i, and a reachable remote destination j, such that $1 < P_{ij} <$ infinity, i has at least one direct outgoing neighbor, k (i.e., $P_{ik}=1$) for which $P_{ij}=P_{kj}+1$. Any such terminal k is a prospective first relay on a minimum hop path to j. Note that by definition, there is no direct outgoing neighbor k such that $P_{kj} < P_{ij}-1$. For a message originator, the algorithm consists of selecting and designating the smallest set of such prospective relays needed to begin routing its message to all destinations. For a relay terminal, the algorithm is somewhat more complicated. The relay terminal must first determine which destination(s) motivated its selection as a relay. It then selects subsequent relays as necessary. A designated relay k, assumes responsibility for a destination j, if it lies on a minimum hop path from the originator i, to the destination, j. This condition is expressed by $P_{ij}=P_{ik}+P_{kj}$. After determining the destinations for which it will take responsibility, the designated relay then uses the same algorithm as the originator to select successor relays, as required. Note that in selecting subsequent relays, both originators and relays can choose to consider the transmit/receive loads of the prospective relays so long as all destinations are accounted for. This consideration may consist of using transmit/receive load as a tie-breaking consideration, or it may extend to selecting lightly loaded, less connected relays over well connected but more heavily loaded ones. In the latter case, the objective of minimizing the aggregate number of transmissions is sacrificed somewhat in favor of load sharing.

The algorithm, as performed by an individual terminal t, is described as follows. It presumes that the terminal has a knowledge of reported network connectivity and has developed a path length matrix, $P_{ij}$, reflecting that knowledge obtained from the DMSO process.

1. Create three lists as follows:

List A—A list of all of the terminal s direct outgoing neighbors, i.e., terminals, k, for which $P_{tk}=1$.

List B—A list of all known destinations which are not on List A. If Terminal t is the originator, then List B should contain all destinations not on List A. If Terminal t is not the originator and the message was originated by Terminal i, then List B should contain all destinations, j, of Terminal i's message for which: $P_{ij}=P_{it}+P_{tj}$.

List C—A list of all subsequent relays selected so far, initially empty.

2. If List B is empty, go to step 7.

3. For each terminal on List A, determine how many of the destinations remaining on List B it can reach in fewer steps than this terminal, i.e., $P_{kj} < P_{tj}$.

4. If none of the terminals on List A is closer than this terminal to any of the terminals remaining on List B, or if List A is empty, then go to step 8.

5. Select the best relay from List A, based on the number of destinations to which it is closer than this terminal, (and possibly, its Transmit/Receive load). Remove the selected relay from List A and place it in List C. Remove from List B, all destinations for which the selected relay is closer than this terminal.

6. Go to step 2.

7. Finished. All relays have been selected and comprise List C. If list C is non-empty, include the specification of subsequent relays with the origination/relay of the message.

8. Finished. The destinations remaining on List B are unreachable. Take whatever action is appropriate. Designate any terminals on List C as relays to those destinations which are reachable.

Figure 21:
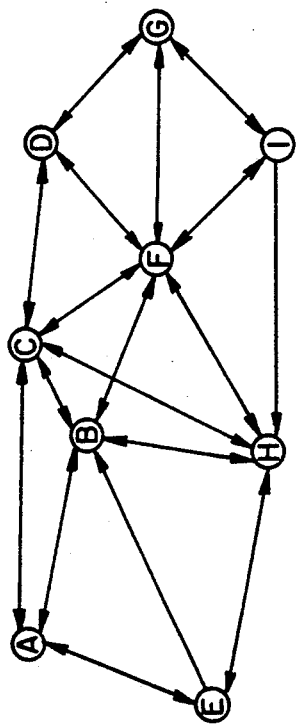
FIG. 21 is a diagram illustrating the routing of a message using a point-to-multipoint routing algorithm in accordance with the principles of the present invention.

The algorithm as performed by an originator is illustrated in FIG. 21. Enhancements are possible in the algorithm to improve the minimization of the number of selected relays. One simple enhancement consists of first selecting any neighbor which is the only prospective relay to one or more remote destinations, regardless of how many other destinations it can reach. Such relays would eventually be selected of necessity. By selecting them first, any other destinations to which they are closer will also be removed from List B and will not unduly affect the selection of other relays.

In summary, using this DMSO point-to-multipoint algorithm, an originator selects the smallest set of prospective first relays needed to begin routing its message to all destinations. For a relay platform, it must first determine which destination(s) motivated its selection as a relay and it then selects subsequent relays as necessary. A designated relay assumes responsibility for a destination if and only if it lies on a minimum hop path from the originator to the destination. After determining the destinations for which it will take responsibility, the designated relay uses the same algorithm as the originator to select successor relays, as required. In the selection of relays, both originators and relays may choose to consider the transmit/receive loads of the prospective relays so long as all destinations are covered. The number of transmissions may thus be increased in order to facilitate load sharing. As in the point-to-point algorithm, one way links are recognized and utilized. The implementation of this algorithm is fully distributed. The originator and each echelon of relay determine and specify the next echelon of relay, but exert no influence on routing thereafter. Each terminal carries out the algorithm autonomously, using only the information it has collected in its database.

Figure 22B:
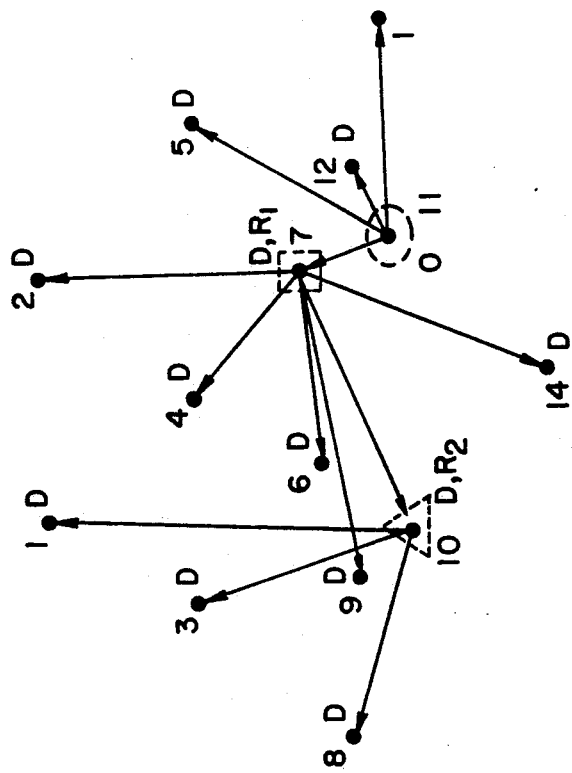
FIG. 22B is a diagram illustrating the routing of a message employing the original DMSO point-to-multipoint algorithm.
Figure 22A:
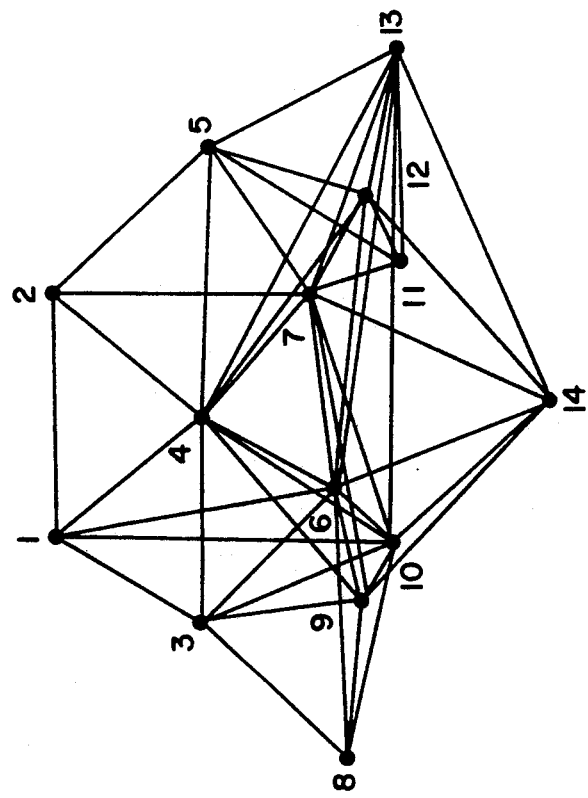
FIG. 22A is a diagram illustrating an example of participants and their connectivity.

An example showing the results and advantages of utilizing the DMSO point-to-multipoint (multicast) algorithm is shown in FIGS. 22A and 22B. FIG. 22A shows fourteen participant platforms in a network and their LOS. FIG. 22B shows the relay platforms selected to route a message originated from platform 11. Platform 7 is a first echelon relay selected by the originator and platform 10 is a second echelon relay selected by platform 7. Thus, with only three transmissions all destinations can be reached. This number should be compared with the fourteen transmissions required by a flood routing algorithm as shown in FIG. 22B. The advantages of the DMSO scheme in terms of platform resource utilization, and for improved LPI is significant.

FIG. 23A shows that if the first echelon relay platform 7 of FIG. 22B is jammed, lost or disabled, the process of continuously monitoring link connectivities will detect this loss and, with this knowledge, the algorithm will determine alternative relays. As shown in FIG. 23A, platforms 5 and 13 are selected as first echelon relays and they, in turn, select platforms 4 and 10 as second echelon relays. The advantage over flood routing, in the required number of transmissions, is still significant, i.e., 5 versus 13 as shown in FIG. 23A. Lastly, if platforms 5 and 13 are disabled as shown in FIG. 23B, platform 11 would then select platform 12 as a first echelon relay which, in turn, selects platforms 4 and 6 as second echelon relays. The transmission advantage of the DMSO process is still maintained as shown in FIG. 23B.

The broadcast routing algorithm is a special case of the point-to-multipoint routing algorithm wherein all terminals are specified as destinations. The originator could explicitly specify each destination, however, a better solution is for the originator to simply specify that the message is to be broadcast routed. This allows subsequent relays to route new destinations not yet known to the originator.

The examples of the previous sections can easily be extended to the cases where some of the platforms within LOS are not circuit participants. However, they still may be employed as "blind" relays by denying them code keys for the COMSEC encryption/decryption processes. For spread spectrum and frequency hopping modulations, these types of platforms can relay if they are supplied only the TRANSEC code key of the system. This key is sufficient to receive and transmit the signal waveforms.

DMSO is applicable to data and voice communications network management of multi-platform communities with dynamic populations and link connectivities. These conditions arise in many armed services tactical and strategic scenarios, involving platform motion, attrition and electronic countermeasures. Tactical applications span the general warfare settings of: anti-air warfare, anti-surface warfare, anti-submarine warfare, air-ground amphibious operations, ground-to-ground mobile operations, etc. Strategic applications, for example, would include the maintenance of global connectivity in Air Defense Initiative and Space Defense Initiative systems. In the airborne, ground, or surface segments of these operations, DMSO could be incorporated as a new function for a spread spectrum, Joint Tactical Information, Distribution Systems terminal, for example. In those applications in which portions of the total network connectivity involve established extrinsic networks, e.g. the Digital Data Network, gateway platforms could be implemented to serve as an interface between DMSO equipped platforms and the specific equipment and protocols of the existing network. Furthermore, the DMSO process can be applied to systems with multimedia transmission capabilities. DMSO operation would be enhanced to determine either the best route for a fixed medium or the best route using a set of links comprising a hybrid mix of media. These multimedia systems and hybrid mix of media systems could be either military or commercial.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method for providing an efficient and adaptive management of message routing in a multi-platform, multi-network communications system having dynamically changing platform populations and dynamically changing connectivities between platforms where each of said platforms are capable of performing the steps of:
   recognizing at least certain ones of said platforms in said system;
   deriving from at least one of said recognized platforms the quality of interconnectivities of said recognized platforms and certain others of said platforms in said system, said quality of interconnectivities transmission media disruptions, recognized transmit and receive power and antenna gain whereby said quality can be determined only after recognition of said platforms; and
   employing said derived quality of interconnectivities to make connectivity-based routing decisions using either a point-to-point routing algorithm, a point-to-multipoint routing algorithm, or a broadcast routing algorithm as appropriate.

2. A method according to claim 1, wherein said step of recognizing includes
   the step of providing a plurality of different accesses to remote recognized platforms from said platform performing the step of recognizing during which said platforms can initiate transmissions, each of said plurality of different accesses being capable of being used by many of said platforms in said system so long as said platforms are not direct neighbors and said platforms do not share a common intermediary platform.

3. A method according to claim 1, wherein said point-to-point routing algorithm is Dijkstra's algorithm.

4. A method according to claim 1 wherein said step of deriving includes the step of
   continuously monitoring the current state of said quality of interconnectivities; and
   said step of employing includes the step of
   updating said routing decisions when said quality of interconnectivities changes.

5. A method according to claim wherein said step of employing includes the steps of
   establishing and maintaining knowledge of said connectivities in said system; and
   using said knowledge effectively to satisfy communication message deliverability requirements for both data and voice traffic in a timely fashion.

6. A method according to claim 3, wherein said certain ones of said platforms are within a first line-of-sight range of that one of said platforms initiating communication where said platform initiating communication is on a direct line with said certain ones, and
said certain others of said platforms are outside of said first line-of-sight range but within a second line-of-sight range relative to at least one of said certain ones of said platforms other than that one of said platforms initiating communication where said platform initiating communication is not in a direct line with said certain ones.

7. A method according to claim 3, wherein
said Dijkstra's algorithm provides a route from an originating platform to a destination platform one platform at a time starting with said originating platform and adding one platform at a time until said destination platform is reached always selecting the next platform on the route to destination.

8. A method according to claim 1, wherein
said point-to-point routing algorithm is a truncated Dijkstra algorithm.

9. A method according to claim 1 wherein
said step of deriving includes the step of
   continuously monitoring the current state of said quality of interconnectivities; and
said step of employing includes the step of
   updating said routing decisions when said quality of interconnectivities changes.

10. A method according to claim 8 wherein
said step of employing includes the steps of
   establishing and maintaining knowledge of said connectivities in said system; and
   using said knowledge effectively to satisfy communication message deliverability requirements for both data and voice traffic in a timely fashion.

11. A method according to claim 8, wherein
said certain ones of said platforms are within a first line-of-sight range of that one of said platforms initiating communication, and
said certain others of said platforms are outside of said first line-of-sight range but within a second line-of-sight range relative to at least one of said certain ones of said platforms other than that one of said platforms initiating communication.

12. A method according to claim 8, wherein
said truncated Dijkstra algorithm provides a route from an originating platform to a destination platform one platform at a time starting from said originating platform and progressing toward said destination platform in hops of predetermined length until said destination platform is reached always selecting the next platform on the route to the destination.

13. A method according to claim 1, wherein
said routing decisions employ a point-to-multipoint routing algorithm.

14. A method according to claim 1 wherein
said step of deriving includes the steps of
   continuously monitoring the current state of said quality of interconnectivities; and
said step of employing includes the step of
   updating said routing decisions when said quality of interconnectivities changes.

15. A method according to claim wherein
said step of employing includes the steps of
   establishing and maintaining knowledge of said connectivities in said system; and using said knowledge effectively to satisfy communication message deliverability requirements for both data and voice traffic in a timely fashion.

16. A method according to claim 13, wherein
said certain ones of said platforms are within a first line-of-sight range of that one of said platforms initiating communication, and
said certain others of said platforms are outside of said first line-of-sight range but within a second line-of-sight range relative to at least one of said certain ones of said platform other than that one of said platforms initiating communication.

17. A method according to claim 13, wherein said point-to-multipoint algorithm includes the steps of
an originating platform selecting the smallest set of prospective first remote platforms needed to begin routing its message to all destination platforms, with said remote platforms to operate as relay platforms for routing said message to said destination platforms,
each of said selected first relay platforms determining which of said destination platforms motivated its selection as a relay, and
each of said selected first relay platforms, after determining said destination platform for which it is responsible, repeating said originating platform process to select successor relay platforms as required.

18. A method according to claim 17, wherein
a selected relay platform assumes responsibility for a particular destination platform if and only if said selected relay platform lies in a minimum distance path from said originating platform to said destination platform.

19. A method according to claim 1, wherein
said routing decisions employ said broadcast routing algorithm.

20. A method according to claim 1 wherein
said step of deriving includes the steps of
continuously monitoring the current state of said quality of interconnectivities; and
said step of employing includes the step of
updating said routing decisions when said quality of interconnectivities changes.

21. A method according to claim 1, wherein
said step of employing includes the steps of
establishing and maintaining knowledge of said connectivities in said system; and
using said knowledge effectively to satisfy communication message deliverability requirements for both data and voice traffic in a timely fashion.

22. A method according to claim 19, wherein
said certain ones of said platforms are within a first line-of-sight range of that one of said platforms initiating communication, and
said certain others of said platforms are outside of said first line-of-sight range but within a second line-of-sight range relative to at least one of said certain ones of said platforms other than that one of said platforms initiating communication.

* * * * *

UNITED STATES PATENT AND TRADEMARK OFFICE
CERTIFICATE OF CORRECTION

PATENT NO. : 5,117,422
DATED : May 26, 1992
INVENTOR(S) : Hauptschein et al.

It is certified that error appears in the above-identified patent and that said Letters Patent is hereby corrected as shown below:

IN THE CLAIMS

Claim 1, column 21, line 31, after "interconnectivities", insert --derived according to platform motion, jamming parameters,--.

Claim 5, column 21, line 61, after "claim", insert --1--.

Claim 15, column 22, line 65, after "claim", insert --1--.

Signed and Sealed this

Third Day of August, 1993

Attest:

MICHAEL K. KIRK

*Attesting Officer*   *Acting Commissioner of Patents and Trademarks*